(12) United States Patent
De Gaudenzi et al.

(10) Patent No.: US 6,466,566 B1
(45) Date of Patent: Oct. 15, 2002

(54) LOW COMPLEXITY ADAPTIVE INTERFERENCE MITIGATING CDMA DETECTOR

(75) Inventors: Riccardo De Gaudenzi, Leiden (NL); Fillippo Giannetti, Buti (IT); Javier Romero Garcia, Leiden (NL); Marco Luise, Livorno (IT); Luca Fanucci, Montecatini Terme (IT); Edoardo Letta, Pisa (IT)

(73) Assignee: Agence Spatiale Européene, Paris (FR)

( * ) Notice: Subject to any disclaimer, the term of this patent is extended or adjusted under 35 U.S.C. 154(b) by 0 days.

(21) Appl. No.: 09/247,898

(22) Filed: Feb. 10, 1999

(30) Foreign Application Priority Data

Feb. 11, 1998 (FR) .............................................. 98 01604

(51) Int. Cl.[7] .............................................. H04B 7/216
(52) U.S. Cl. .......................... 370/342; 375/144; 375/148
(58) Field of Search ................................ 370/252, 203, 370/204–9, 320, 335, 342, 441; 375/130, 140–144, 147–148, 149, 150, 152, 229, 230–2

(56) References Cited

U.S. PATENT DOCUMENTS

| 5,905,721 A | * | 5/1999 | Liu et al. ..................... 370/342 |
| 6,047,020 A | * | 4/2000 | Hottinen ...................... 370/342 |
| 6,078,573 A | * | 6/2000 | Batalama et al. ........... 370/335 |
| 6,219,341 B1 | * | 4/2001 | Varanasi ..................... 370/252 |
| 6,240,099 B1 | * | 5/2001 | Lim et al. .................... 370/342 |

* cited by examiner

*Primary Examiner*—David Vincent
(74) *Attorney, Agent, or Firm*—Barry R. Lipsitz

(57) ABSTRACT

An adaptive signal receiver comprising at least one blind detection unit arranged to be robust to asynchronous multiple access interference (MAI). The useful signal is detected using a user signature sequence comprised of a fixed term and a complex adaptive part having a length that extends over a number of samples within a defined observation window. Provision is made for updating automatically and periodically the complex adaptive part of the signature sequence.

10 Claims, 27 Drawing Sheets

BER SYSTEM PERFORMANCE WITH AND WITHOUT ERROR SIGNAL TRUNCATION EFFECTS FOR L=128, N=64, $E_b/N_o$=6dB AND C/I=−6dB

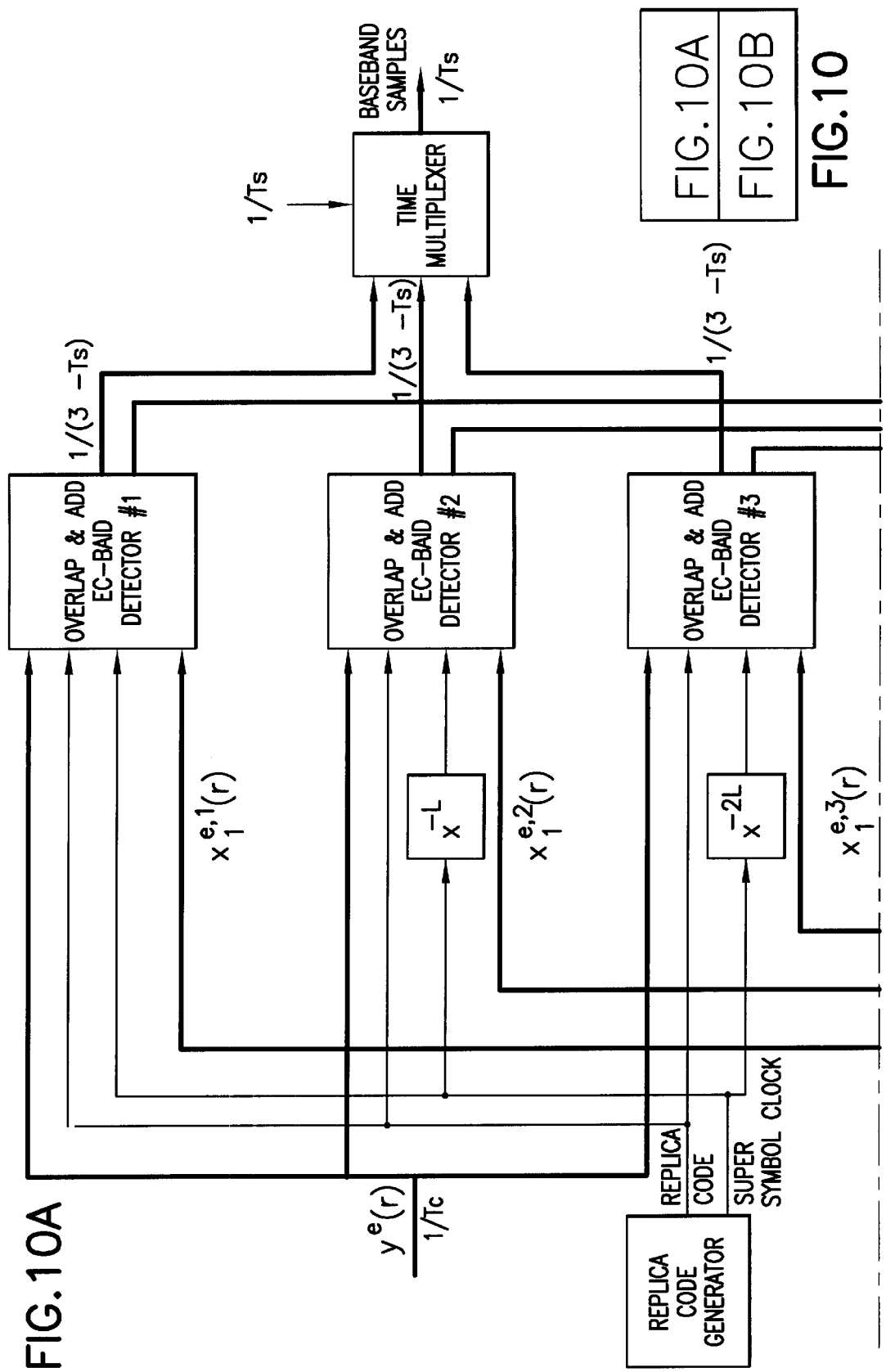

EC-BAID STEADY STATE DETECTOR COEFFICIENTS: $E_b/N_0 = 4$ dB, $L=64$, $K=19$, $[C/I]sc=-6$ dB, $\Delta f_i \cdot T_s = 1$, $\gamma = 1.2 \; 10^{-4}$ ER VS. $\gamma$ FOR DIFFERENT DETECTORS: $E_s/N_0$=6 dB, L=64, K=19, [C/I]sc=−6 dB a) BER vs. $\Delta f_k \cdot T_s$ FOR EC-BAID DETECTOR: L=64, K=19, $[C/I]_{sc}$ =−6dB,
b) BER vs. $\Delta f_k \cdot T_s$ FOR DIFFERENT DETECTORS: BPSK-RS, L=64, K=19, $[C/I]_{sc}$=−6dB

| FIG.14A |
| FIG.14B | FIG.14 |

PDF OF $\rho$ FOR $E_b/N_0$ =4dB, K=19, [C/I]sc=−6dB,
a) BPSK-RS L=64 CR, C-BAID, EC-BAID,
b) EC-BAID L=32 FOR BPSK-RS, L=64 FOR d-BPSK AND QPSK-RS BER VS. $E_b/N_o$ FOR EC-BAID AND CR WITH DIFFERENT SIGNAL FORMATS: L=32 FOR BPSK-RS, L=64, FOR d-BPSK AND QPSK-RS, K=19, $[C/I]_{sc}$=-6dB

LOW COMPLEXITY ADAPTIVE INTERFERENCE MITIGATING CDMA DETECTOR

FIELD OF THE INVENTION

The present invention relates to the field of Code Division Multiple Access (CDMA) communications with direct sequence/spread spectrum (DS/SS) modulated signals. It is concerned in particular with a novel adaptive signal receiver for CDMA communication systems.

BACKGROUND OF THE INVENTION

A CDMA communication system transmits information from a number of users over a common channel using different code sequences referred to as signatures. In these systems, the transmitters send the information independently from each other. Therefore, signals from different users arrive asynchronously at the receiver. Because the cross correlations between the signatures for signals from different users are non zero, the received signal from a user is sensitive to nearby interfering signals from other users.

This sensitivity to interference from other users contrains the number of active users operating at a specified system bit error rate (BER), and therefore CDMA systems are said to bear a modest overall capacity in terms of number of users/bandwidth.

Some attention has already been focused on the Multiple Access Interference (MAI) and in the last decade there has been an explosion of interest on multiuser interference rejection and multiuser detection (MUD). The purpose of MUD is to achieve the joint demodulation of all user data streams. One of the major outputs of the extensive research activity, inspired by the discovery of MUD, was the recognition that the sensitivity to MAI of CDMA is not inherent to the access method itself, rather it is essentially related to the incorrect utilization, in a multiple-access environment, of the single-user correlation receiver that presently represents the optimum scheme for processing a single DC/SS signal in an additive white Gaussian noise (AWGN) channel (see "Optimum Multiuser Asymptatic Efficiency" by S. Verdú, IEEE Transactions on Communications, September 1986, pp. 890–897).

The implementation of a multiuser receiver is not straightforward: firstly due to the high computational complexity for the optimum scheme and secondly because even suboptimum lower-complexity schemes call for accurate estimation of the code timing, the carrier phase and/or the signal power of all the active network users. The latest step towards a practical implementation of a MAI-resilient detector is represented by the class of single-user adaptive receiver an example of which is disclosed for instance in "MMSE Interference Suppression for Direct-Sequence Spread-Spectrum CDMA", by Upamanyu Madhow et Michael L. Honig, IEEE Transactions on Communications, Vol. 42, No. 12, December 1994, pp. 3178–3188. This type of receiver of capable of eliminating a substantial portion of the multiuser interference, but it needs to be adjusted by a proper training sequence that must be known a priori, before data transmission can occur.

A robust and simple receiver of this kind that can operate without need for a training sequence is disclosed in "Blind Adaptive Multiuser Detection", by Michael Honig, Upamanyu Madhow, Sergio Verdú, IEEE Transactions on Information Theory, Vol. 41, No. 4, July 1995, pp. 944–960. The simulation results presented therein are relative to the case of BPSK DS/SS synchronous signals with rectangular chips, ideal coherent detection and a low AWGN level. The ideal coherent detection is in fact a strong assumption that largely reduces the applicability of blind adaptive interference-mitigating detection (BAID) scheme to practical systems. The use of the BAID detector requires the prior knowledge of the useful channel carrier frequency and phase that is generally unknown to the receiver and that can not be accurately estimated prior to DS/SS signal detection.

In particular, the authors of said publication envisage application of BAID to the initial receiver acquisition phase only, just to bring the signal-to-noise ratio after detection in the vicinity of 0 dB.

In such conditions, a decision-aided detector can directly take over without the need of a special training sequence. Such decision-aided detector is disclosed in "Adaptive Receiver Structures for Asynchronous CDMA Systems", by Predag B. Rapajic and Branka S. Vucetic, IEEE Journal on Selected Areas in Communications, Vol. 12, No. 4, May 1994, pp. 685–697. Although optimal in performance, a data-aided detector requires the prior knowledge of the transmitted symbols. Assuming a slowly variant channel as compared to the symbol duration, it is possible to insert a preamble of known data in the data stream at regular intervals to help the detector convergence.

In this case, however, there is a penalty due to the increased data rate and the need for fast converging algorithms like Recursive Least Square that drastically increases the algorithm complexity and presents numerical stability problems. While the decision-aided approach does not require the prior knowledge of a training sequence, it has however a is major drawback in its poor performance under low signal-to-noise ratio conditions whereby symbol estimates become unreliable and detector performance rapidly degrades. This behavior is particularly harmful when the signal amplitude significantly fades, as is the case in many practical (mobile) systems or when path diversity is exploited.

In this case, equalization has to be performed on each Rake receiver finger at lower input signal-to-noise ratio. Furthermore, the adaptive detection approach in this known detector is not insensitive to the unknown phase of the useful signal and the useful channel carrier frequency error.

It is known that the data-aided MMSE algorithm provides intrinsic phase estimation on top of interference mitigation. This is an apparent advantage as it relates the algorithm convergence speed for interference mitigation to the carrier phase tracking. Over fading channels the algorithm performs poorly unless the useful signal phase is pre-corrected before entering the adaptive MMSE detector (see A. N. Barbosa, S. L. Miller "Adaptive Detection of DS/CDMA Signals in Fading Channels" IEEE Trans. on Comm., Vol. 46, No. 1, January 1998 whereby a solution based on a complicated phase estimates to remove phase errors at the detector input is proposed). The proposed solution being phase transparent does not suffer from this important problem and allows to effectively separate the useful signal phase estimation from CDMA interference mitigation.

SUMMARY OF THE INVENTION

The present invention deals with an extension of the blind adaptive interference mitigating detection (BAID) scheme to the general case of asynchronous CDMA signals with arbitrary interferer timing and frequency offset in order to enhance the performance of a DS-CDMA receiver with affordable complexity increase.

It is an object of this invention to provide a blind adaptive receiver for CDMA signals which minimises the detrimental effect of multiple access interference (MAI) on the bit-error rate (BER) performance and which does not require using a known training sequence.

A further object of this invention is to provide a low-complexity blind adaptive receiver for CDMA signals that is robust to asynchronous MAI.

Yet another object of this invention is to provide a blind adaptive receiver scheme that is robust to the interferers frequency error and is invariant to a possible carrier phase offset.

These and other objects of the invention are attained by an adaptive receiver for CDMA signals which comprises means arranged to perform the symbol detection in the incoming data stream using a user signature sequence comprised of a first fixed term and a second complex adaptive part having a predetermined length that extends over a number of samples. Means are provided to update automatically and at successive regular intervals encompassing the duration of one symbol or a plurality of symbols.

The second complex adaptive part is determined starting from the error signal of the carrier frequency measured on the signal obtained after detection.

The blind adaptive detector incorporated in the CDMA receiver of the invention can be implemented in modular form well suited for a compact ASIC digital implementation on a user terminal. The embodiment includes unobvious techniques to avoid the impact of a definite number of bits being used by DSP/ASIC to represent the signals.

The solutions proposed herein are particularly suited for application to satellite communication systems, but they can be adapted for use in terrestrial communication systems as well. Also, the invention can be adapted for use in communication systems having a variable transmission rate as proposed for the third-generation standards for wireless CDMA communication.

The main advantages of the invention can be summarized as follows:
1. There is no need for training sequences to help algorithm convergence nor knowledge of interferer parameters. The only parameters required are the useful channel signature sequence and chip timing information as for a conventional detector.
2. Robustness to asynchronous CDMA interference even for large interferer power unbalance and carrier frequency offsets.
3. The detector is insensitive to the unknown phase of the useful signal and can adopt conventional BPSK symbol rate phase estimators.
4. Increased robustness to the residual baseband useful channel carrier frequency error as compared to conventional data-aided Minimum Mean Square Equalizer (DA-MMSE).
5. System performance is very close to the optimum DA-MMSE linear detector in the SNR region of practical interest for a coded system.
6. The adaptive detector can operate at very low SNR typical of a coded system and supports more spectral efficient Dual-BPSK Spread Spectrum signal formats (D-BPSK/SS).
7. It is well suited for a compact ASIC digital implementation on a user terminal.

The invention can find practical applications in the following domains:

Fixed and mobile satellite communication networks.
CDMA-based positioning systems.
Terrestrial CDMA networks.

DESCRIPTION OF EXEMPLARY EMBODIMENTS OF THE INVENTION

The CDMA Signal Format

Figure 1:
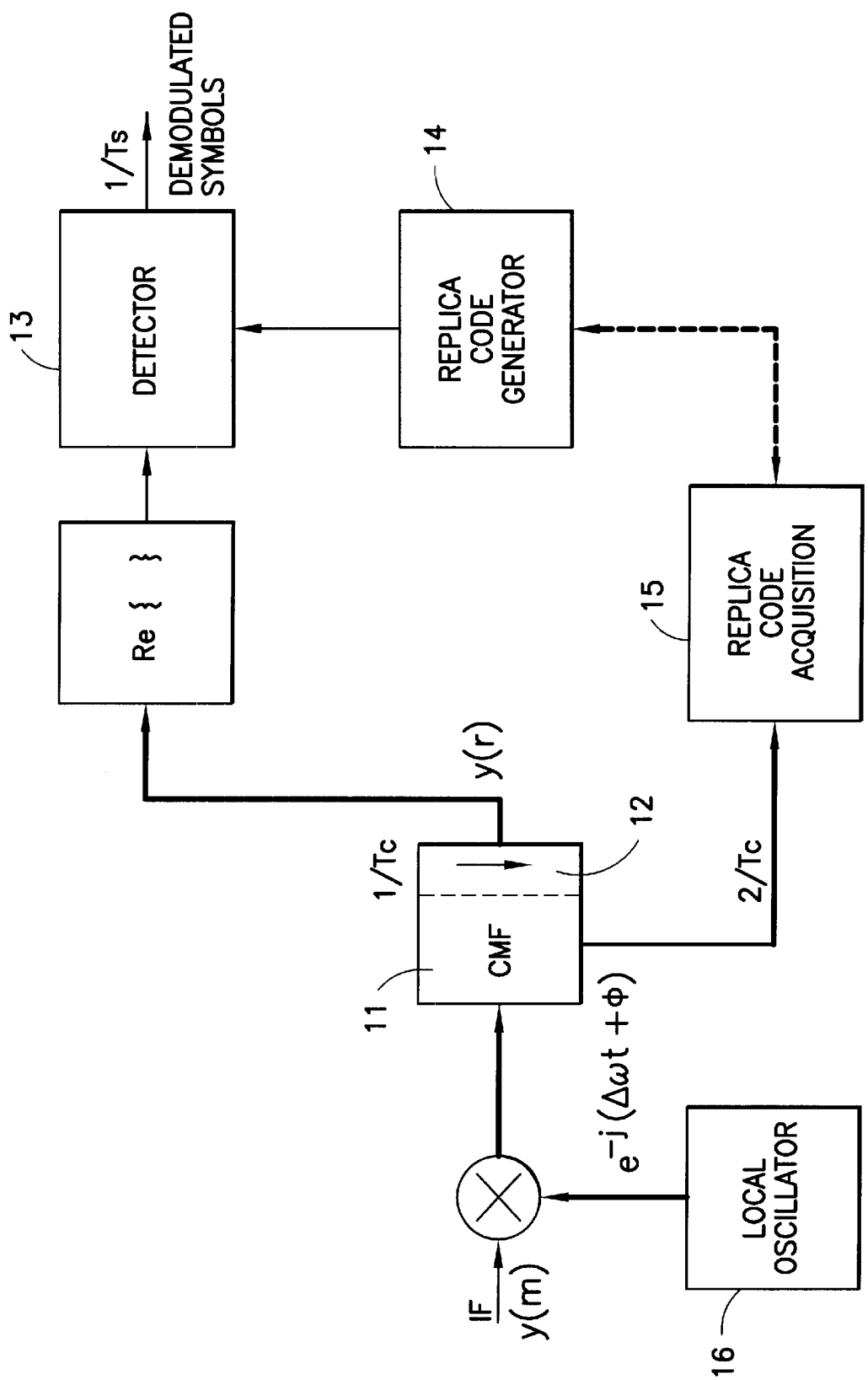
FIG. 1 is a block diagram of a prior art blind adaptive receiver.

The signal format introduced here is quite general and corresponds to DS/Spread Spectrum (DS/SS) with two-dimensional modulation. In the most general case the incoming binary data stream at rate $R_b$ for the k-th user is split between the two Phase-Quadrature (P-Q) rails by means of a serial-to-parallel converter. The resulting symbols $a_{k,p}(u)$, $a_{k,q}(u) \in \{-1,1\}$ are independently spread by the P-Q signature sequences $c_{k,p}(l)$, $c_{k,q}(l)$ and filtered prior P-Q carrier modulation. The resulting complex k-th signal is given by $$e_k(t) = \sqrt{Dp_k} \sum_{U=-\infty}^{\infty} [a_{k,p}(u)s_{k,p}(t - uT_s - \tau_k) + ja_{k,q}(u)s_{k,q}(t - uT_s - \tau_k)] \cdot$$

$$\exp[j(2\pi\Delta f_k t + \phi_k)]$$

$$s_{k,h}(t) = \sum_{l=1}^{L} c_{k,h}(l)g_T(t - lT_c), \quad h = p, q$$

where D is an amplitude factor related to the signal modulation dimensionality (see Table 1), $P_k$ is the k-th signal power, L is the period for both spreading sequences, $T_c$ is the chip time, $T_s=1/(2R_b)=Lt_c$ is the symbol time, $\Delta f_k$ is the k-th carrier frequency offset with respect to the nominal frequency $f_o$, $\phi_k$ is the k-th user carrier phase, $g_T(t)$ is the impulse response of the chip shaping filter, and $\tau_k$ represents the k-th user signal delay. Without loss of generality we also assume $0 \leq \tau_k < T_s$.

The signature sequences $c_{k,h}(l)$ may be "compound" sequences such as Walsh Hadamard (WH) functions overlaid by extended pseudo-noise (PN) sequences having the same period and start epoch [1]. Compound sequences are necessary in multi-beam, multi-satellite systems, or cellular terrestrial systems wherein the overlay PN is beam/sector unique, and different WH signature sequences are assigned to each different user within the same beam/sector. Notice that we also assumed short codes, i.e., $T_s=Lt_c$ in order for the EC-BAID to be applicable. In this case, the code length L is also coincident with the spreading factor $T_s/T_c$.

Equation (1) represents a variety of modulation and spreading formats as summarized in Table 1. For conventional detectors with symbol length spreading sequences d-BPSK and QPSK-RS doubles the available codebook size for orthogonal sequences with no bandwidth penalty. In case of carrier phase errors, d-BPSK provides increased robustness with respect to QPSK-RS [1].

The (baseband equivalent of the) received signal r(t) is a multiplex of K different signals in the form (1), plus (the baseband equivalent of) the AWGN complex process v(t) with two-sided power spectral density $N_o$. Thus $$r(t) = \sum_{k=1}^{K} e_k(t) + v(t)$$

Assuming now, for notation simplicity, that channel k=1 is the wanted channel we can re-write eqn. (2) as $$r(t)=e_1(t)+J(t)+v(t)$$

TABLE 1

| | | Signal formats | | | |
|---|---|---|---|---|---|
| Scheme | Modulation | Spreading | D | $T_s/T_b$ | Properties |
| BPSK-RS | BPSK | real (RS) | 2 | 1 | $a_{k,q} = c_{k,q} = 0$ |
| BPSK-CS | BPSK | complex | 1 | 1 | $a_{k,p} = a_{k,q}$ |
| d-BPSK | 2xBPSK | (CS) | 1 | 2 | $c_{k,p} \neq c_{k,q}$ |
| QPSK-RS | QPSK | 2xreal real (RS) | 1 | 2 | $c_{k,p} = c_{k,q}$ | with $J(t) \triangleq \sum_{k=2}^{K} e_k(t)$ representing the MAI term. The sampled chip matched filter (CMF) output can be expressed as:

$$y(\tau)=r(t) \otimes g_R(t)|_{t=rTc}$$

being $g_R(t)$ the CMF impulse response.

Referring now to FIG. 1, there is shown a prior art blind adaptive receiver as disclosed in the publication "Blind Adaptive Multiuser Detection" mentioned herein before. After being translate into the baseband, the signal y(m) is received in a baseband filter 11, e.g. a Nyquist square-root raised cosine chip matched filter, the function of which is to limit the noise bandwidth without affecting the useful signal. The signal is then sampled at intervals Tc in sampler 12. Each sampling interval Tc is a sub-multiple of the symbol duration Ts. The complex samples are thereafter applied to a detector 13 for being processed to deliver the demodulated symbols at the symbol rate. To this end, the detector 13 receives the user code sequence as generated by a replica code generator 14. A replica code clock acquisition unit 15 is provided as it is in each conventional spread-spectrum demodulator. A frequency and phase estimator 16 serves to eliminate the frequency offset and carrier phase errors.

As mentioned above herein, the receiver according to the invention is designed and arranged in such a way as to cancel the multiuser interferences in a communication channel without need for a known training sequence prior to data transmission, nor any other information related to the interfering signals. For this purpose, the receiver performs a detection processing and incorporates means to detect the useful channel bit stream so as to minimize the mean square error (MSE) between the actual detector output and the correct output we would get in the absence of noise and MAI.

Broadly stated, the adaptive detection processing is an extension of the one disclosed in the above-mentioned publication "Blind Adaptive Multiuser Detection", the content of which is incorporated herein by way of reference. The detection processing of the invention differs from the Michael Honig et al approach in that detection is made by performing a correlation on a number L of samples Y using a modified user signature sequence thereby to minimize the effect of interfering signals while despreading the signal without loss of performance.

In accordance with the invention, the user signature sequence is composed of two components: a fixed term $c_1$ (the anchor) and a complex adaptive part $x_1$ (auxiliary code) that is updated at least symbol per symbol using a recursive algorithm.

For the most simple C-VAID embodiment, this can be expressed as:

$$h_1(r)=c_1+x_1(r)$$

$$c_1=[c_1(1), \ldots c_1(L)]^T$$

where $h_1(r)$ is the signature sequence.

The auxiliary code has a length that encompasses the duration of at least two interfering symbols and it is automatically computed for each symbol or after several symbols using an adaptation rule that can expressed by the following relations:

$$b'_1(r) = \frac{1}{L}C_1 - Y(r)$$

$$x_1(r) = x_1(r-1) - \gamma b_1(r)\left[y(r) - \frac{Y(r)^T \cdot c_i}{L} \cdot C_1\right]$$

where

| | |
|---|---|
| $b_1(r)$ | is the detector output symbol, |
| $\gamma$ | is the update step to be set as a compromise |

-continued between acquisition speed and steady-state performance.

Contrary to the prior art, the adaptation coefficients of the response vector $h_1(r)$ are complex valued as well as the detector output symbol $b_1(r)$.

This novel approach in accordance with this invention provides a number of advantages. First, the detector is rotationally phase invariant. This allows to exploit two (four in case of Dual BPSK format) projections of the received signal on the two (four) dimensions of the signal space, which are in general required to perform optimum coherent signal demodulation in the presence of carrier phase errors.

Second, the detector is resistant to non co-frequency MAI and this has big relevance to practical systems where large frequency offsets among different carriers occur with respect to the digital signaling rate.

A third advantage resides in that the complex blind adaptive receiver of the invention can be used with D-BPSK DS/SS signals, which minimizes the standard mean square error. This feature is very important for systems using short spreading sequences to exploit cyclo-stationary properties of the code. This is disclosed in "Two Different Philosophies in CDMA-A Comparison", by S. Ventú and A. J. Viterbi, IEEE Vehiculor Technology Conference, Atlanta, Ga., Apr. 28–May 1, 1996.

The receiver of the invention can operate with any spreading sequence that meets with the specified condition. In many practical systems (satellite or terrestrial), use is made of sequences composed of a unique internal sequence for each channel within a sector or beam (sequence Walsh-Hadamard or Gold) and an external sequence having the same timing and the same length as those of the internal sequence (pseudo-noise). Using a second slow external sequence with a pulse duration equal to the symbol duration permits to solve very large delay differences necessary for instance in case of combination of signals from different satellites. The length of this sequence is an integer multiple of the symbol duration.

The complex response vector $h_1$ is designed so as to minimize the mean square error (MSE) between the actual detector output and the output in the absence of noise and interference (MAI). The detector is made adaptive through a simple stochastic gradient algorithm thereby to find the solution to the minimization problem stated above. More sophisticated adaptation algorithms such as the so-called Recursive Least Squares (RLS) or variations thereof can be used to enhance speed convergence with the penalty of higher complexity.

Figure 2:
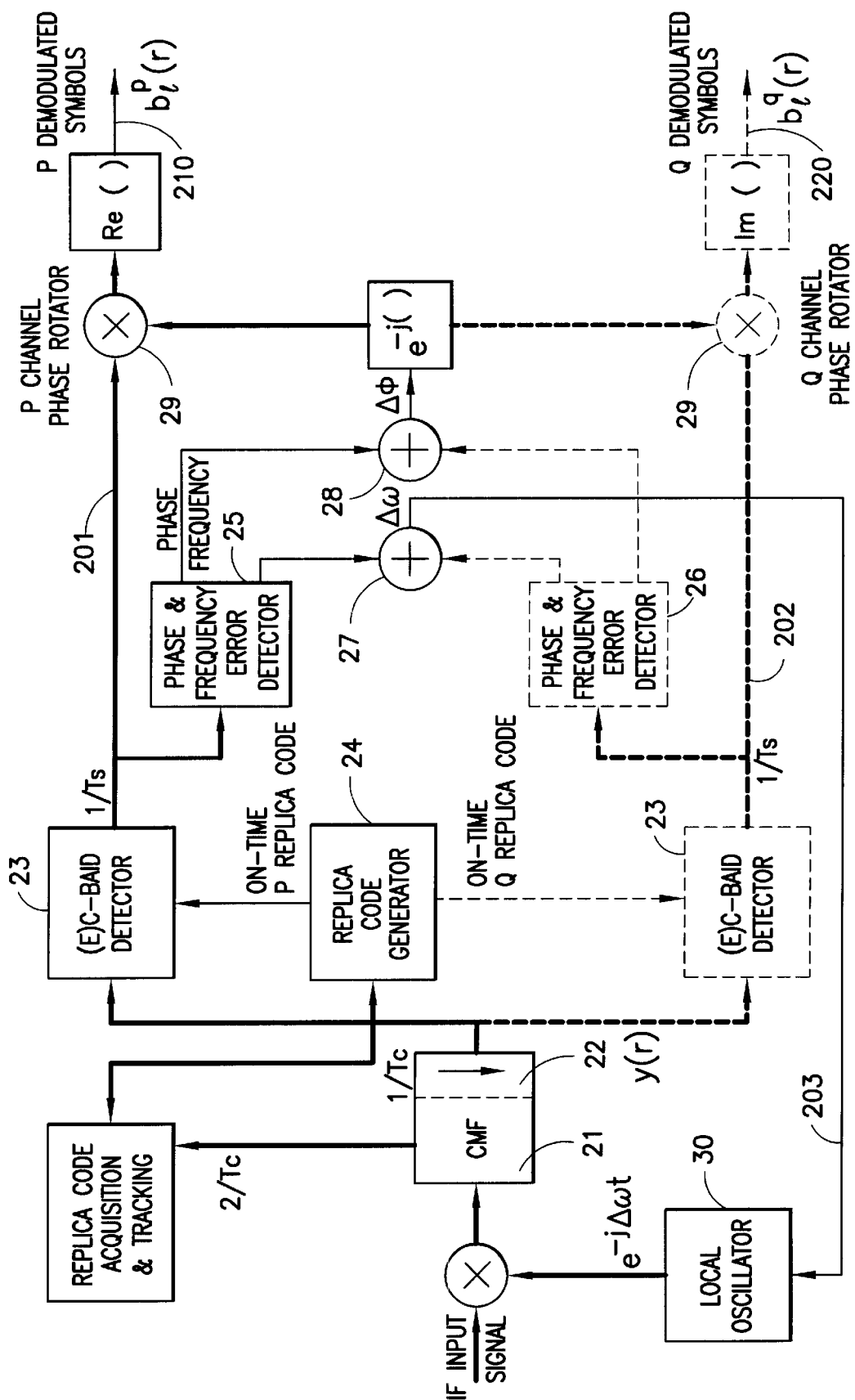
FIG. 2 is a block diagram of an adaptive receiver in accordance with the invention.

FIG. 2 shows an example of possible implementation for the adaptive receiver structure according to the invention Dual BPSK/SS signals. After baseband translation, the received signal y(m) enters a chip matched filter (CMF) 21 and is then sampled every Tc seconds in sampler 22. The complex baseband samples enter then the P-Q C-BAID detectors 23. Each of them processes one of the two D-BPSK/SS signal components and delivers the complex baseband samples at symbol rate on lines 201 and 202 respectively. Processing in the detectors 23 occurs using a user replica code sequence generated by a replica code generator 24. Phase and frequency error detectors 25 and 26 operate at the rate 2/Tc to estimate the phase and frequency to remove the frequency offset and phase residual error prior to final P-Q soft sample delivery.

Thanks to the rotationally phase invariance of the C-BAID detector 23 of the invention, frequency and phase errors can be estimated after despreading and adaptation, thus at a SNR typical for digital communication systems. The implementation shown in FIG. 2 is provided for coherent detection.

The rotationally phase invariance allows the demodulator to be simplified by providing a simple differential symbol detector at the output of the C-BAID detectors 23.

Despite the C-BAID rotationally phase invariance, the carrier frequency estimation needs to be quite accurate. However, this is not a major drawback as accurate frequency estimate is required anyway for initial signal acquisition. In order to avoid that the frequency error at the C-BAID input exceeds the tolerable range, the receiver includes a long frequency control loop 203 that receives the frequency error signal $\Delta\omega$ at 27 and uses it to control the downconverter oscillator 30. The phase error signal $\Delta\phi$ at an output 28 of the detectors 26 is applied to phase rotators 29 for the samples of channels P and Q. The in-phase modulated symbols $b^P(1)$ and the in-quadrature modulated symbols $b^Q(2)$ are delivered at outputs 210 and 220, respectively.

Figure 3:
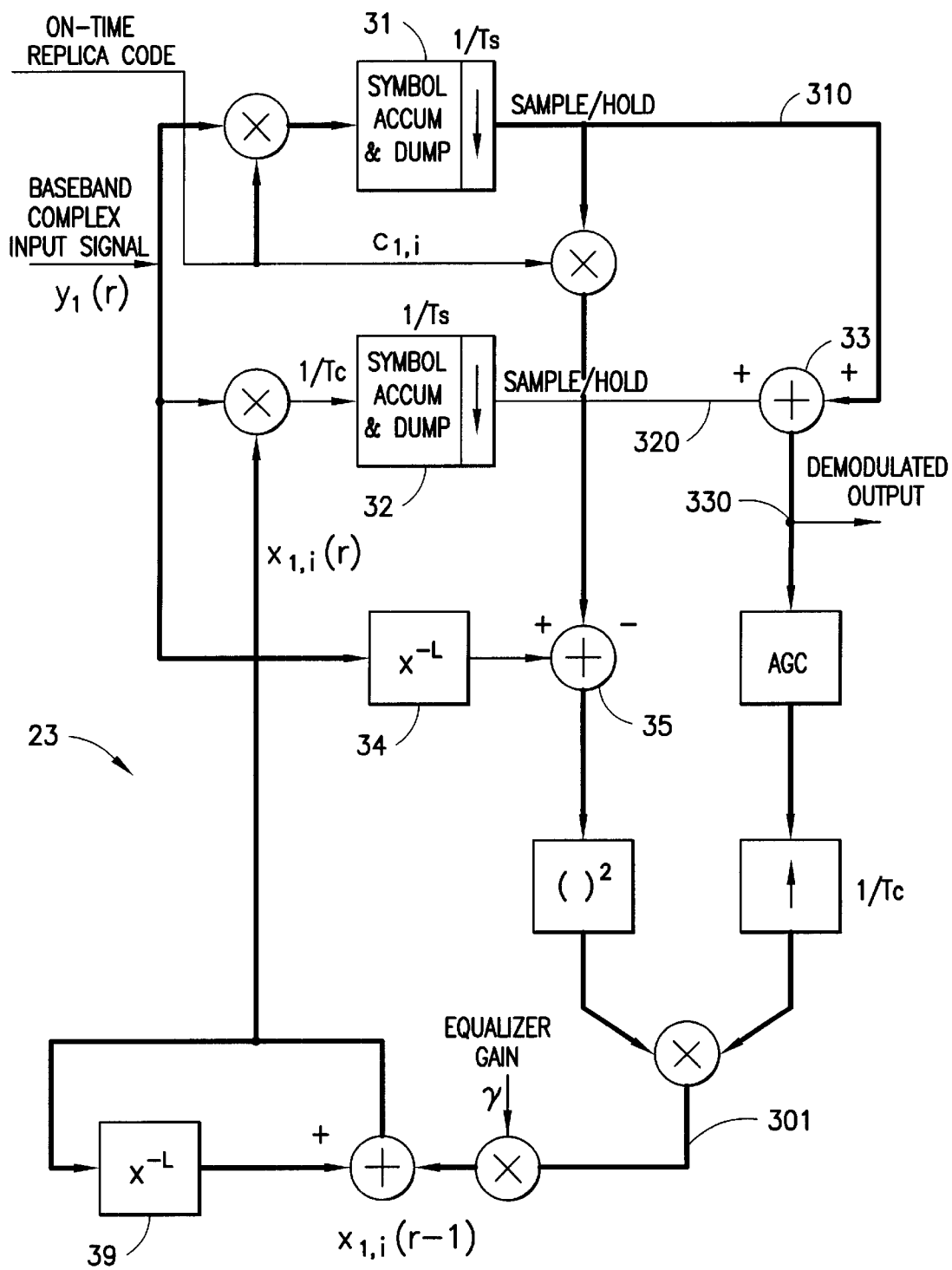
FIG. 3 is a functional block diagram of the detection unit shown in the receiver of FIG. 2.

As mentioned earlier herein, the correlation processing according to the invention uses a signature sequence comprised of a fixed term (replica code) and an adaptive part (auxiliary code) that is updated at least symbol per symbol. This updating and the auxiliary code despreading can be performed in a simple digital circuit comprising a feedback loop with a sampling clock equal to the signal clock. FIG. 3 shows a functional block diagram of a possible implementation for the C-BAID detector 23. The correlation is performed in two blocks 31 and 32 that perform multiply and add operations: the first block 31 performs the correlation using the replica code $C_1$ while the second block 32 performs the correlation using the auxiliary code $X_1(r)$. Updating the auxiliary code requires a correlation loop 301 that is easily implementable by simple digital devices such as multiplier, adder, delay circuit, shift register etc. Of particular interest is the way the adaptive auxiliary code is generated by a simple complex shift register 39 and an adder 37. The blocks denoted by the reference numerals 34, 36 and 38 represent delay circuits (known per se).

The outputs 310 and 320 form blocks 31 and 32, respectively, are combined in adder 33, the output of which delivers the detected symbol $b_1$. It is to be noted in this regard that the correlation processing involves an inherent delay since it is performed on L samples. As a result, while the detector 23 is detecting the symbol $b_1(r)$, its output delivers the preceding symbol $b_1(r-1)$.

A further interesting feature of the invention is that the response vector $h_1(r)$ of the detector can be extended over an enlarged observation window spanning over the duration of several interfering symbols. Tis time span increases the detector performance so as to better cope with the asynchronous CDMA interference effects. A three symbol window represents a good trade-off between complexity increase and performance advantage. A shorter window (two symbols) may provide similar performance under certain circumstances, but does not substantially simplify the demodulation hardware described in the following.

Figure 4A:
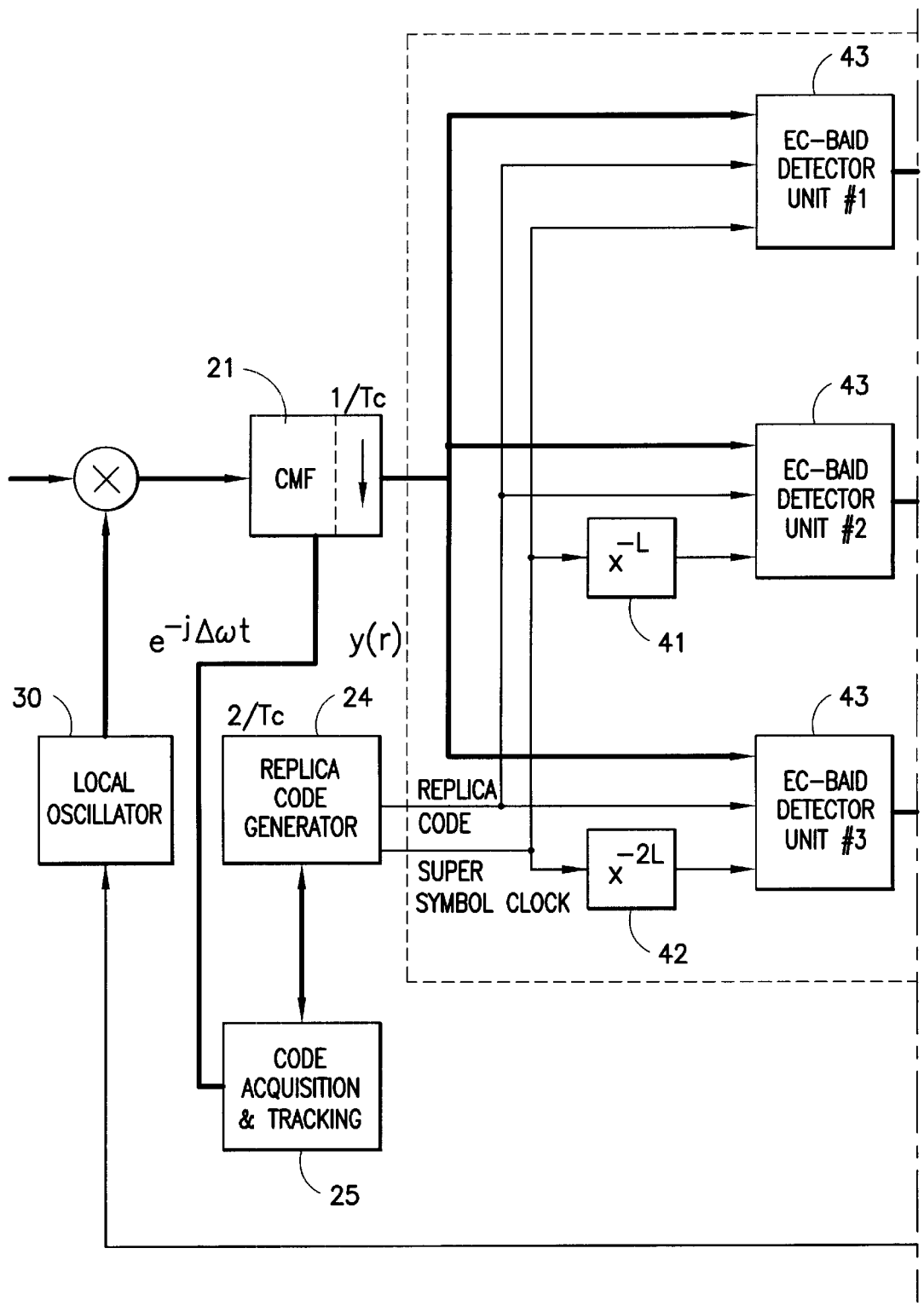
FIG. 4 illustrates a variation of the adaptive receiver according to the invention.
Figure 4B:
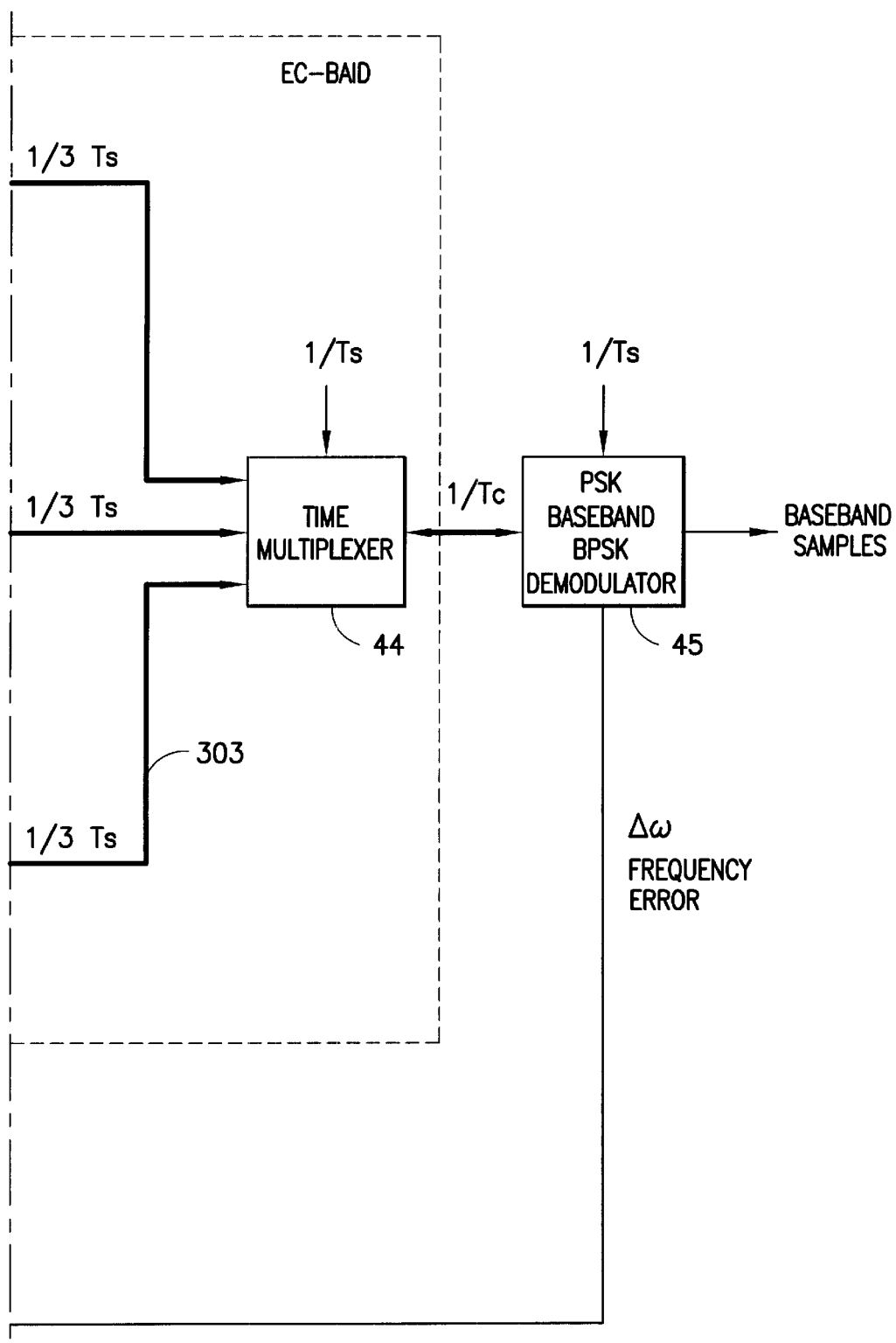

FIG. 4 represents a block diagram of an adaptive receiver for Direct-Sequence (DS) CDMA signals. This receiver comprises three identical detector (EC-BAID) units 43. Each of them operate over an observation window having a three symbol length (3L) with the window being delayed relative to each other and overlapping each other. The diagram of FIG. 4 is pretty similar to that of FIG. 2 except that each detector unit is arranged to perform a three-symbol correlation using an auxiliary code having a 3L length and that the adaptation coefficients are updated after three symbols. The blocks 41 and 42 represent digital delay lines to shift the observation windows. Block 44 represents a time multiplexer running at frequency 1/Ts. Block 45 represents a PSK demodulator running at the symbol rate. The frequency error signal Δω is generated in the demodulator and applied to the frequency control loop 303. The reference numerals 21, 24, 25 and 30 denote a base band filter, a replica code generator, a replica code acquisition unit and a down-converter oscillator as shown in the diagram of FIG. 2.

Figure 5A:
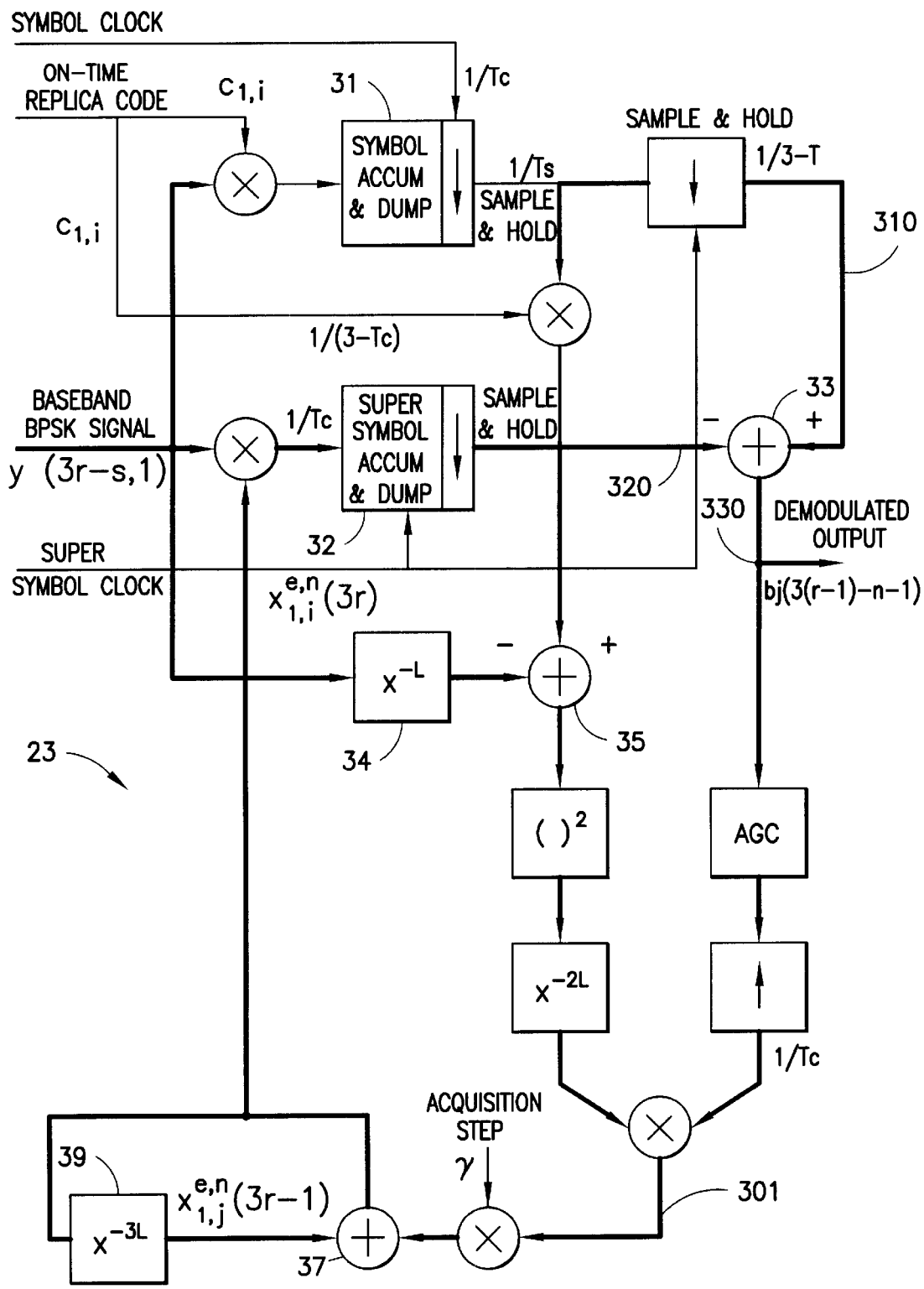
FIGS. 5a and 5b are functional block diagrams of two implementations of the detection unit incorporated in the receiver of FIG. 4.
Figure 5B:
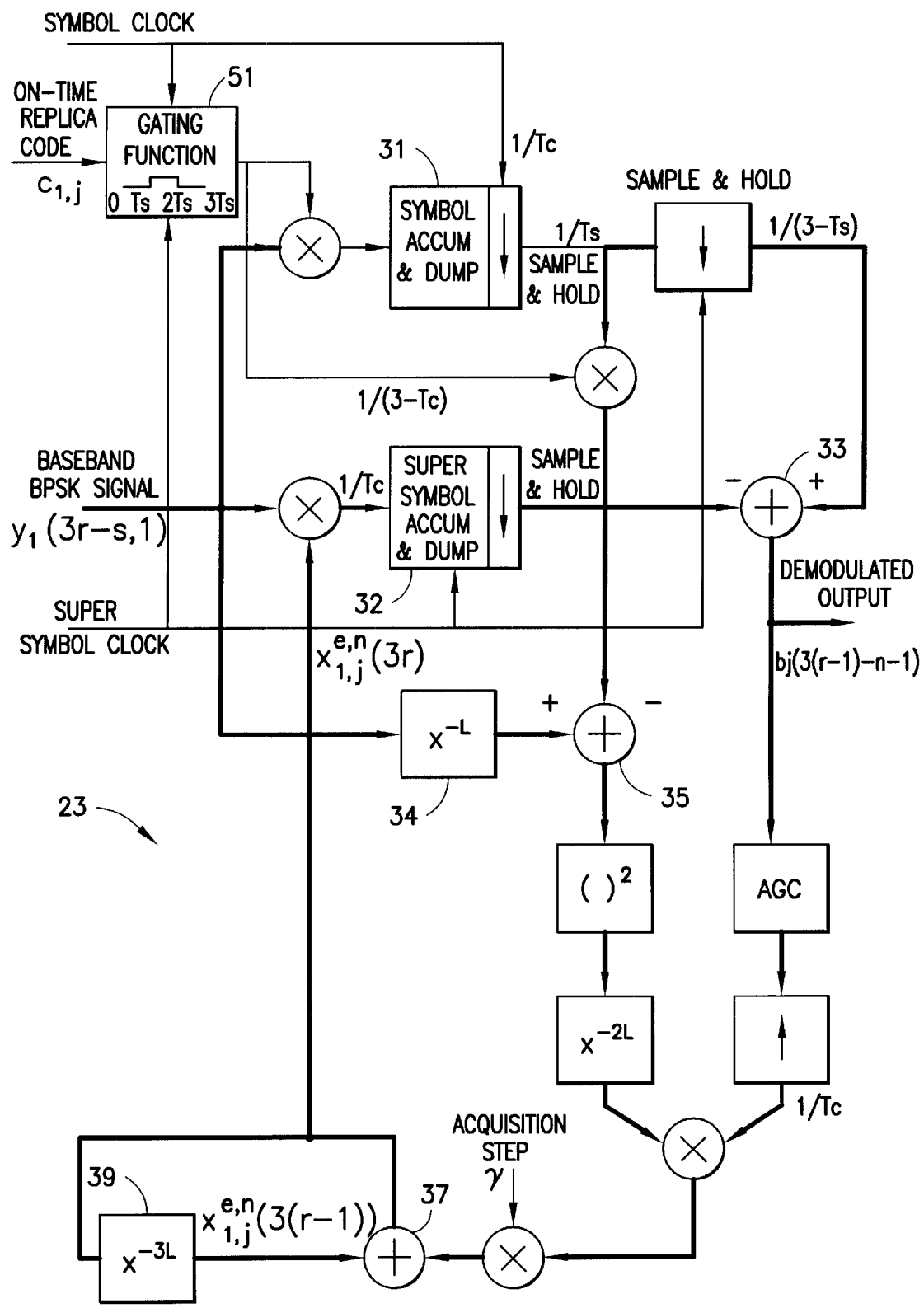

FIG. 5a illustrates the structure of a detector unit (EC-BAID I) similar to that of FIG. 3. On FIG. 5b there is illustrated another structure for the detector unit (EC-BAID II) that is also similar to the structure shown in FIG. 3, except that it includes a so-called gating function 51 for multiplying the replica code $C_1$ under control of the symbol clock (runing at frequency $1/LT_c$) and the super-symbol clock (running at frequency $1/3LT_c$).

Figure 6A:
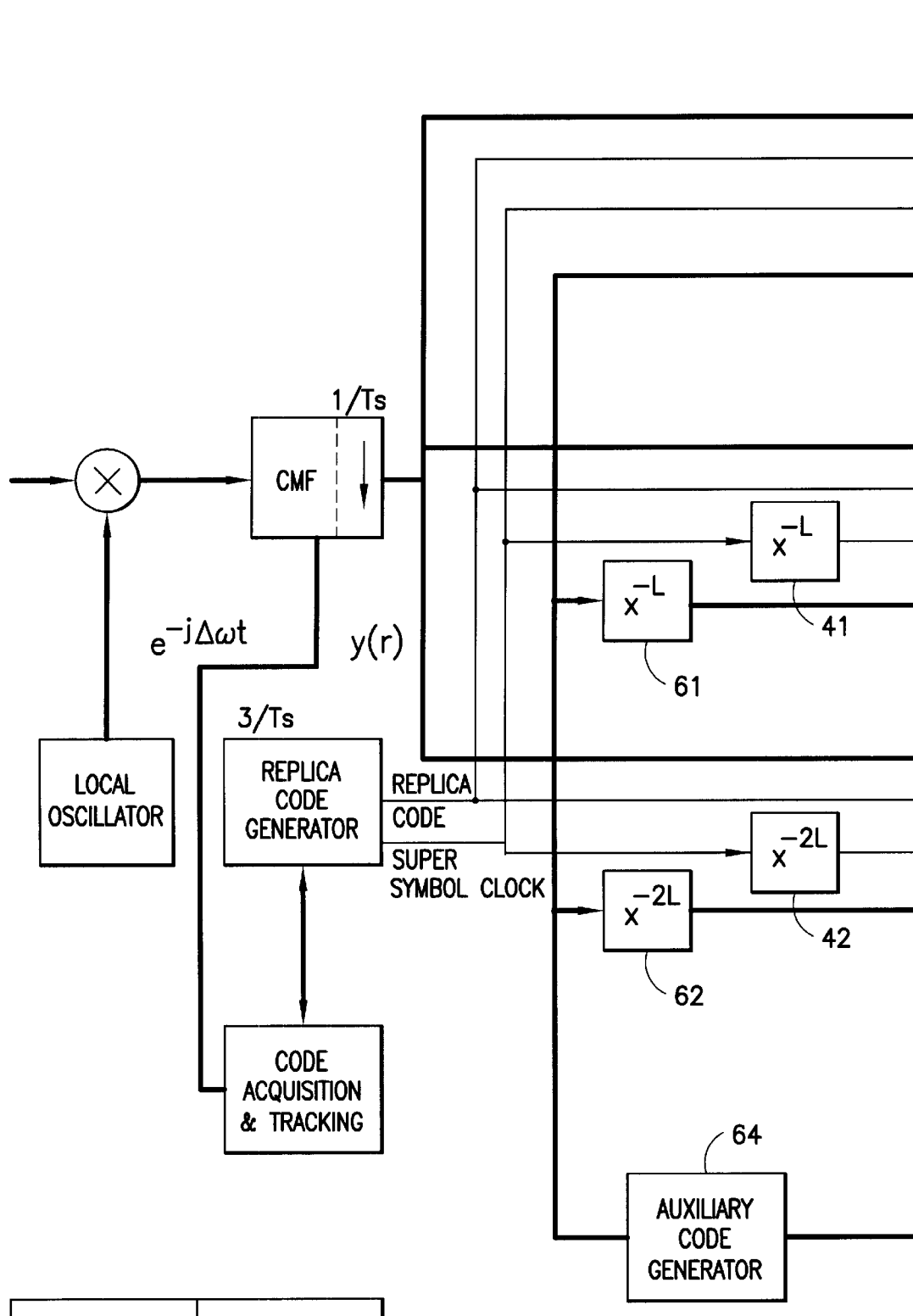
FIG. 6 is a functional block diagram of a variation of the adaptive receiver of FIG. 4.
Figure 6B:
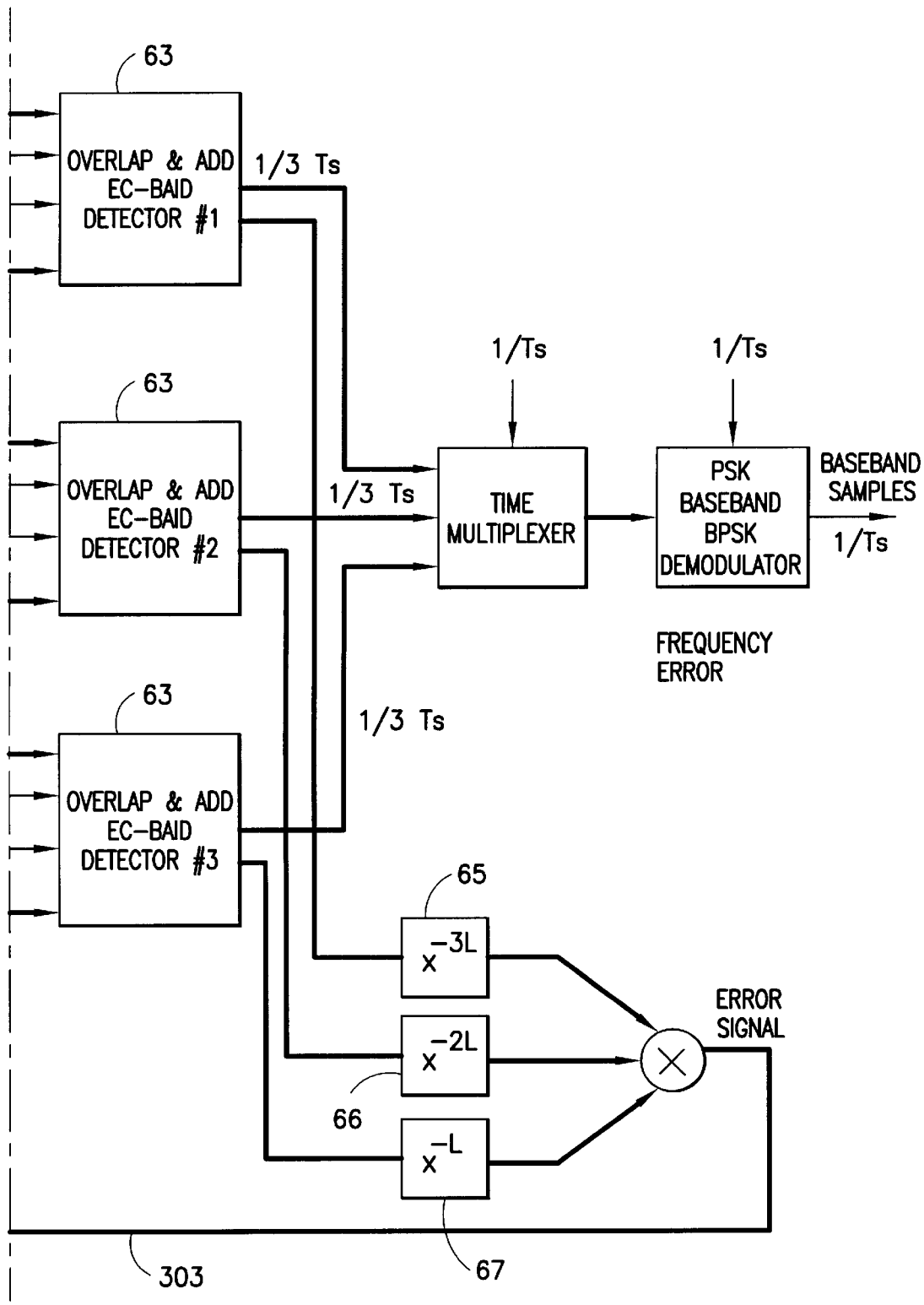
Figure 7A:
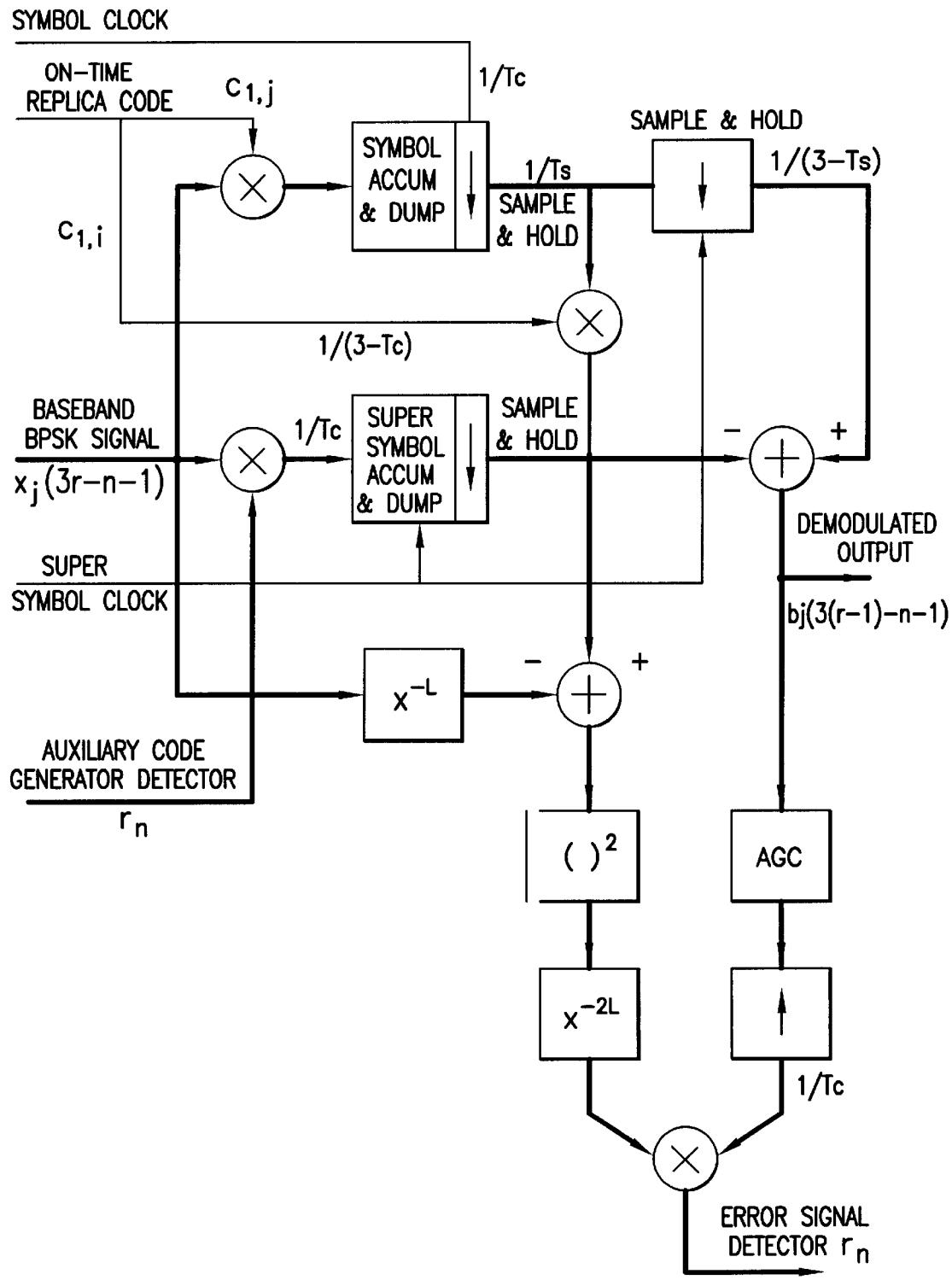
FIGS. 7a–7c are functional block diagrams of two implementations of the detection unit incorporated in the receiver of FIG. 6.
Figure 7B:
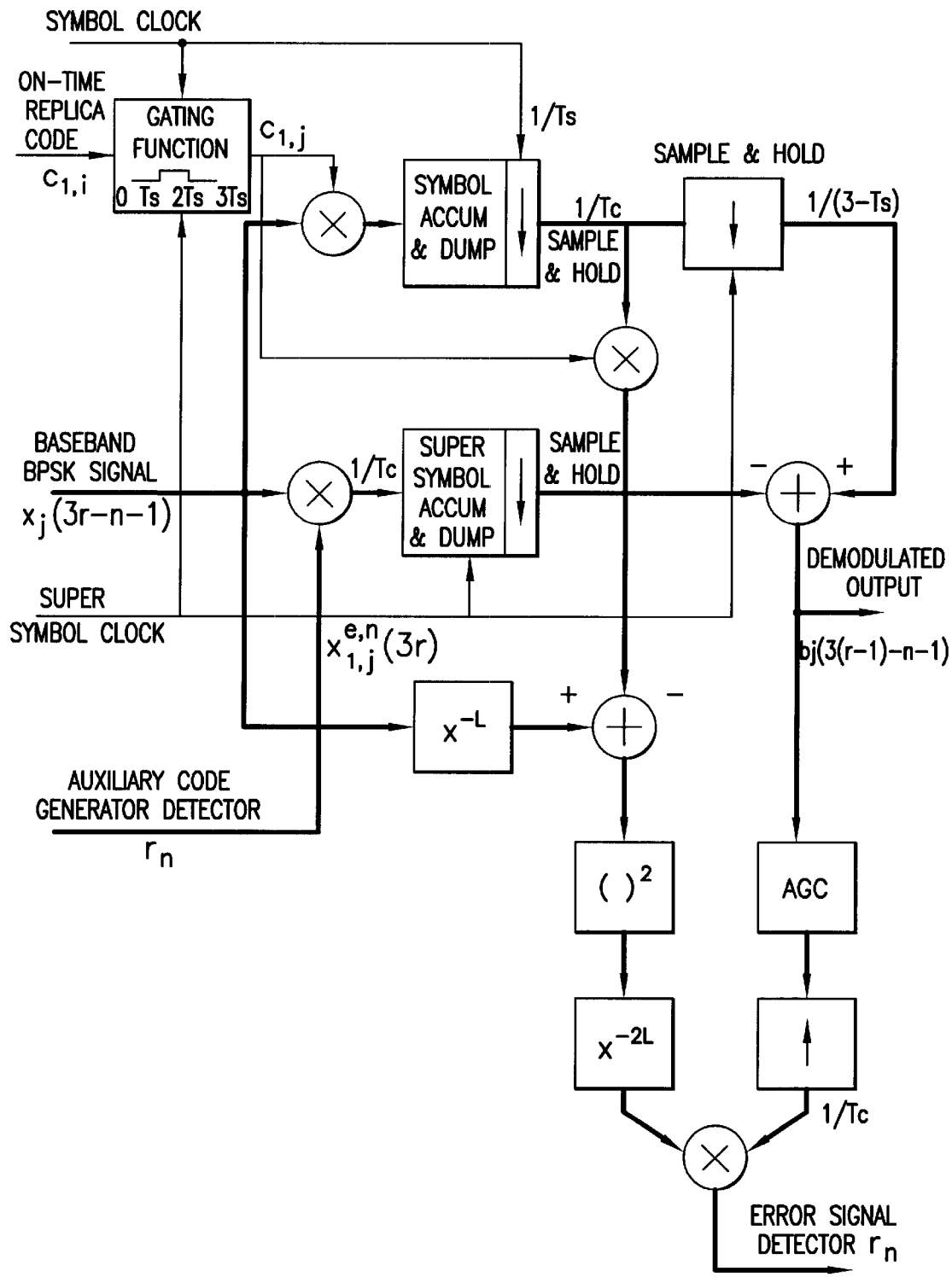
Figure 7C:
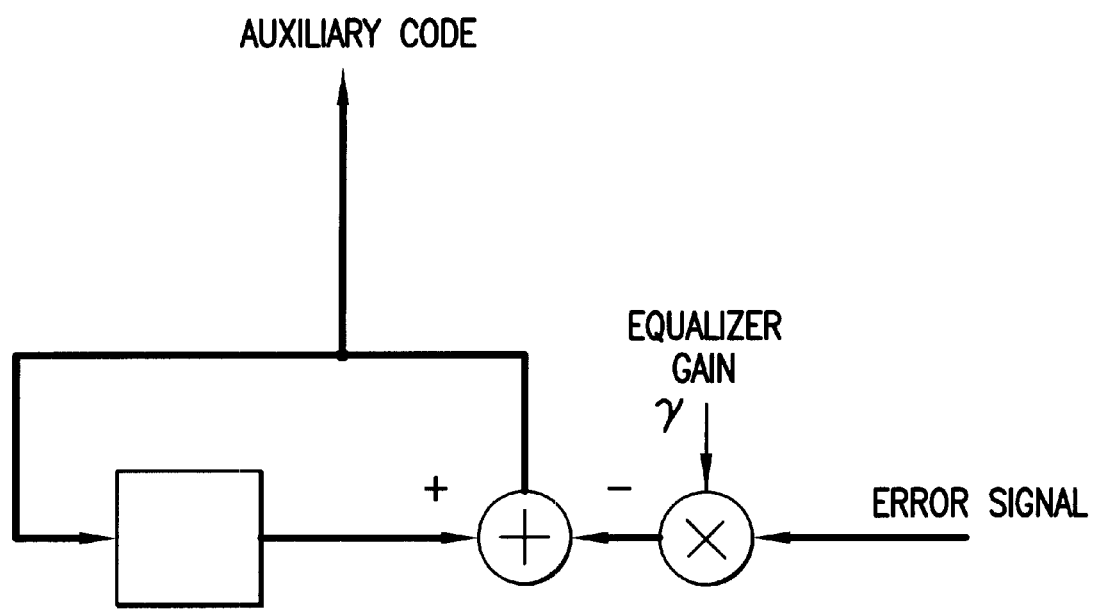

In the diagram of FIG. 4, the detector units 43 are independent from each other, that is each of them generates a respective frequency error signal. However, the invention permits to implement a receiver in which the error signals generated by the different detector units are combined with each other thereby to increase the detection performance. To this end, the arrangements described before herein can be modified as illustrated in FIGS. 6 and 7. On FIG. 7a there is shown a structure for the EC-BAID I detector unit; and FIG. 7b shows a structure for the EC-BAID II detector unit. In this case the adaptive receiver comprises a unique external auxiliary code generator 64 that is completely updated after every symbol interval. The frequency error signal on line 203 for the generation of the auxiliary code is produced by coherent combination of the three individual error signals delivered at the output of the digital delay lines 65, 66 and 67. The reference numerals 41, 42, 61 and 62 also denote digital delay lines.

The fact that the EC-BAID I embodiment (see FIG. 5a) imposes the orthogonality condition for the auxiliary code $\bar{x}_e$ with respect to the anchor $\bar{c}_1$ is due to the fact that in this way the demodulator is robust vis-a-vis non perfect randomness of the modulating data pattern. It can be seen that the EC-BAID II performance is degraded when the data pattern is partly non random. The EC-BAID II does not won at all in case of an unmodulated ODMA signal whilst EC-BAID I wons perfectly in all conditions with insignificant performance loss compared to EC-BAID II even for pure random data.

The Select and Add Architecture

Figure 8:
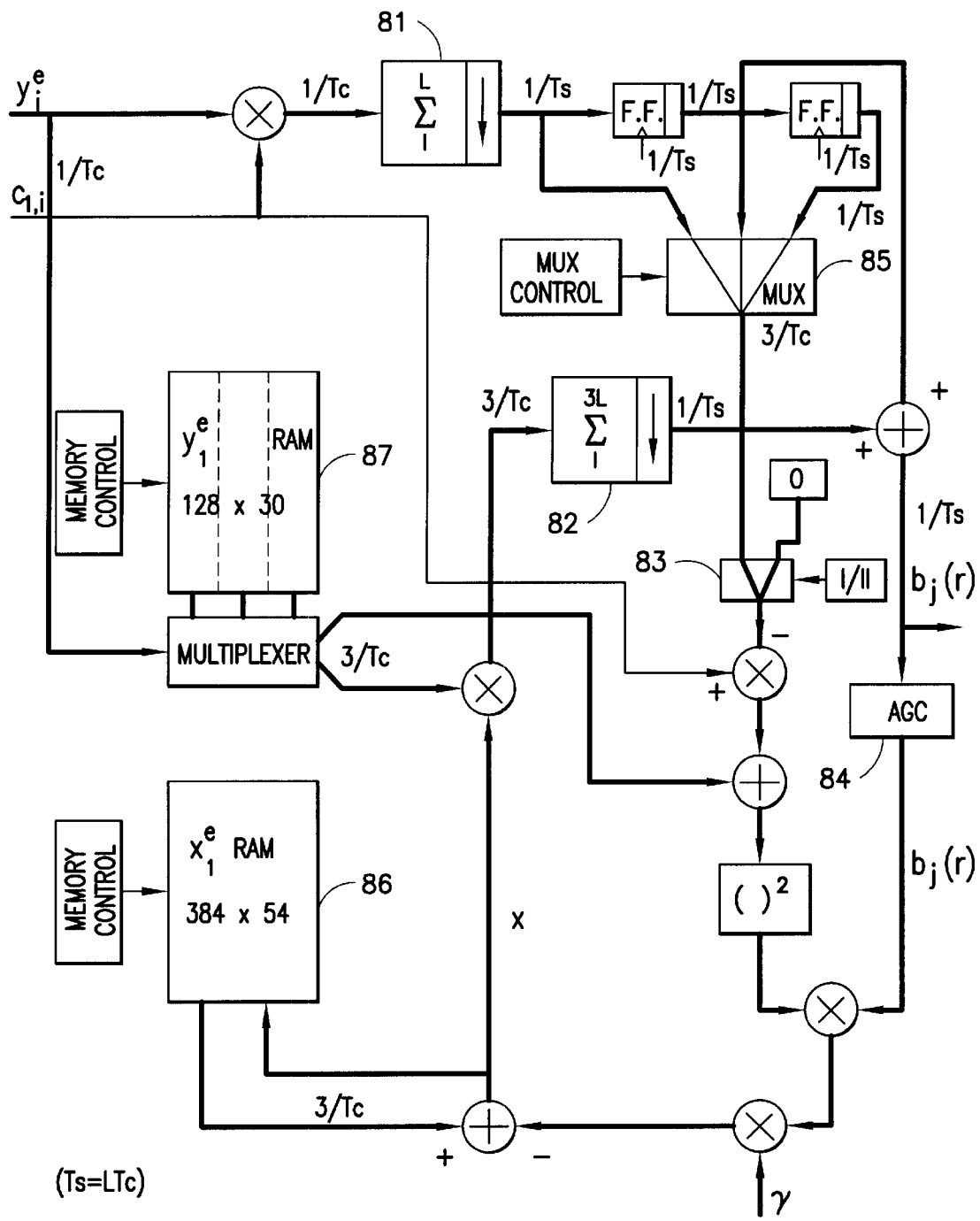
FIG. 8 shows an optimized architecture for a variation of the detection unit according to the invention.

Another possible EC-BAID option has been dubbed Select and Add. As depicted in FIG. 8, the correlations $y(r) \cdot c_1$ and $x^e_1 \cdot c^e_1$, respectively, are evaluated in blocks 81 and 82 to yield the $b_1(r)$ output at symbol rate. The vector $x^e_1$ is stored in memory 86 and each of its 3L elements is updated every $T_c/3$; in particular, during the i-th chip period within the r-th symbol period, the coefficients of $x_1$ relevant to the i-th chip of y(r=1), y(r) and y(r+1) are updated. The most recent 3L input chips are stored in memory 87. Multiplexers 85 and 88 properly re-align internal dataflow, while multiplexer 83 selects the desired EC-BAID algorithm version between I and II. More precisely for EC-BAID II the switch is set to zero for the external chuncks of the error signal as the anchor orthogonality condition shall only be imposed for the central (useful) symbol. The AGC 84 on the feedback loop is needed in order to keep the $b_1$ value constant for the error signal generation at different SNIR operating conditions.

The main difference between S&A and O&A resides in the evaluation of the error signals and in the relevant update of the adaptive vector $x_1$: in the O&A groups of three error contributions are summed every $3T_s$ while in the S&A each error contribution is summed separately every $T_s$ and this way numerical results and convergence speed are almost equal.

The S&A architecture is characterized by a considerable hardware complexity saving in terms of both arithmetical elements and memory cells at the expenses of an increased clock rate.

In fact, for O&A proper operations three distinct arithmetical units are required and moreover, in addition to the memory capacity for $x_1$, some extra delays (memory elements) are needed to provide proper timing between signals of the various circuit branches.

On the other hand, in the S&A version only one arithmetical unit is needed due to hardware multiplexing, and moreover only vector $x_1$ and 3L input ($y^e$) samples have to be stored, so that the extra delay blocks previously mentioned are no longer needed.

These modifications, without affecting overall performances, allow for nearly 50% gate complexity saving and for nearly 70% RAM capacity saving at the expenses of a three times higher clock rate. The latter may limit the S&A applicability to very high chip rate applications.

Error Signal Truncation Effects

The S&A fixed-point ASIC implementation inevitably introduces some truncation errors with respect to theory which is based on floating-point arithmetic. For this particular adaptive architecture, which is based on a feedback loop, these quantization errors may have dramatic effects on the overall algorithm convergence. In particular, because of this quantizations, the error contributions which are used to generate the adaptation vector $x_1$ may be not perfectly orthogonal to the code sequence vector; this situation has to be avoided because the algorithm is able to maintain a stable steady-state value only for the $x_1$ component which is orthogonal to $c^e_1$ (it is referred here to the EC-BAID II, but the same considerations are valid for the EC-BAID I, taking into account that in that case the algorithm controls the $x_{1,\infty}$ components orthogonal to $c^e_1$). On the other hand, if the finite arithmetic effects generate a $x^e_1$ component which is not orthogonal to $c^e_1$, this one may indefinitely increase without being controlled by the algorithm, and thus causing failure of the whole system.

In order to avoid this situation it is sufficient to calculate the error signal $e_1$ (based on the quantized $y^e$ and $b_1$ values as shown here below with full-precision arithmetic.

$$E_1^A b_1 \left[ y^{c \cdots}(\tau) - \frac{y^{c \cdot}(\tau)^T \cdot c_1}{L} c_1 \right];$$

Figure 9:
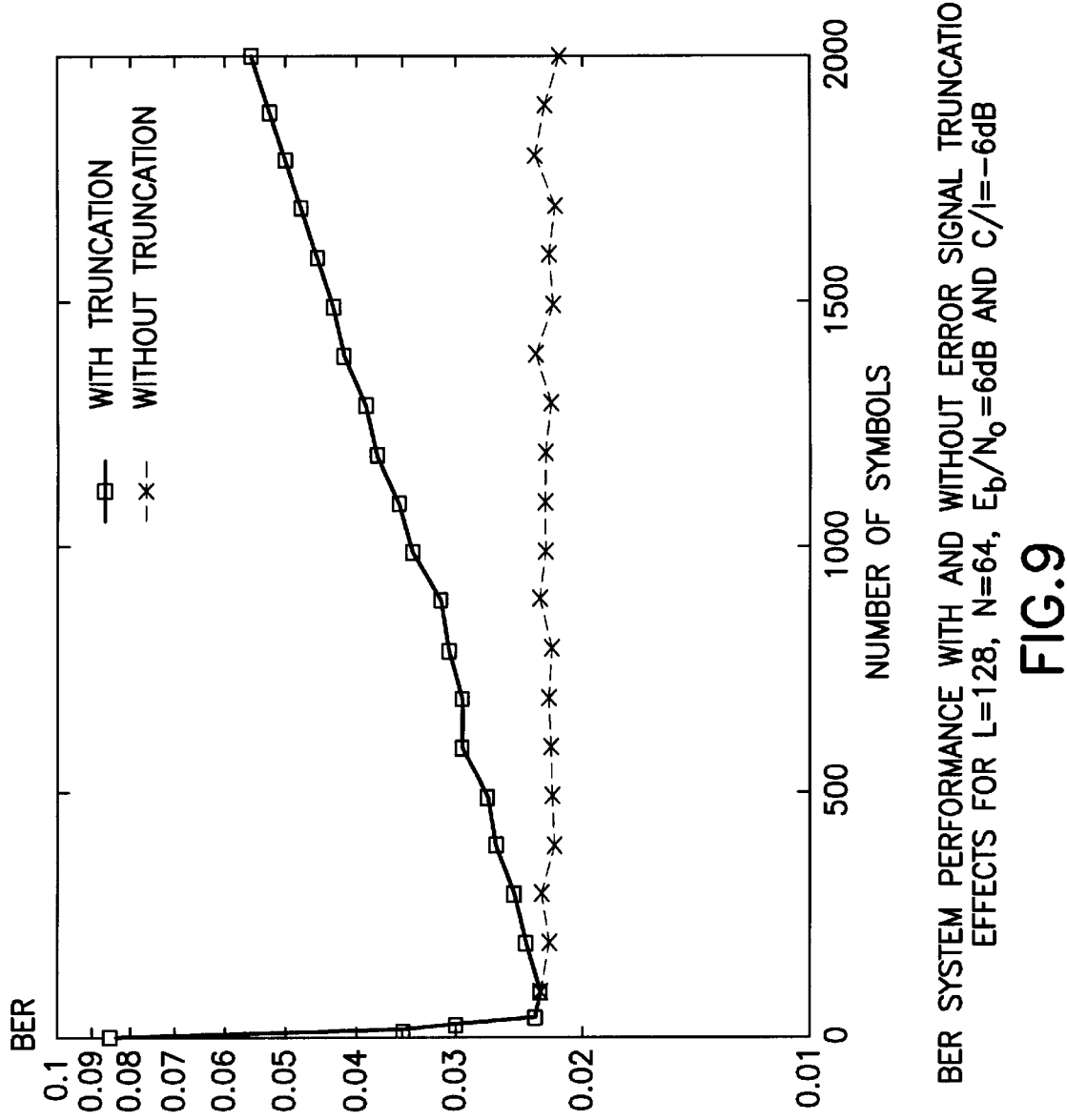
FIG. 9 is a diagram showing the BER performance of a system incorporating the invention.

The error signal generated this way is perfectly orthogonal to $c_1$ thus preventing the aforesaid problem. This means that, starting from quantized $y^e$ and $b_1$ values, the processing relevant to $e_1$ (and so $X^e_1$) is performed with an internal word-length suitable for whole signal dynamics, so that no further truncation is introduced. FIG. 9 shows that the BER system performances (for L=128, N=64, $E_b/N_o$=6 dB and C/I =−6 db) when no further truncation is introduced in the evaluation of $e^e_1$ (and so $x^e_1$) as well as when there is just 1-bit error in the internal word-length dimensioning.

Finite arithmetic effects on all the other S&A circuit internal signals can be regarded as additional noise without causing any problem to the algorithm convergence towards the steady-state vector $x^e_{1,opt}$. Although this solution has been exemplified for the S&A case its applicability can be more general.

The Linear Combiner Architecture

Figure 10B:
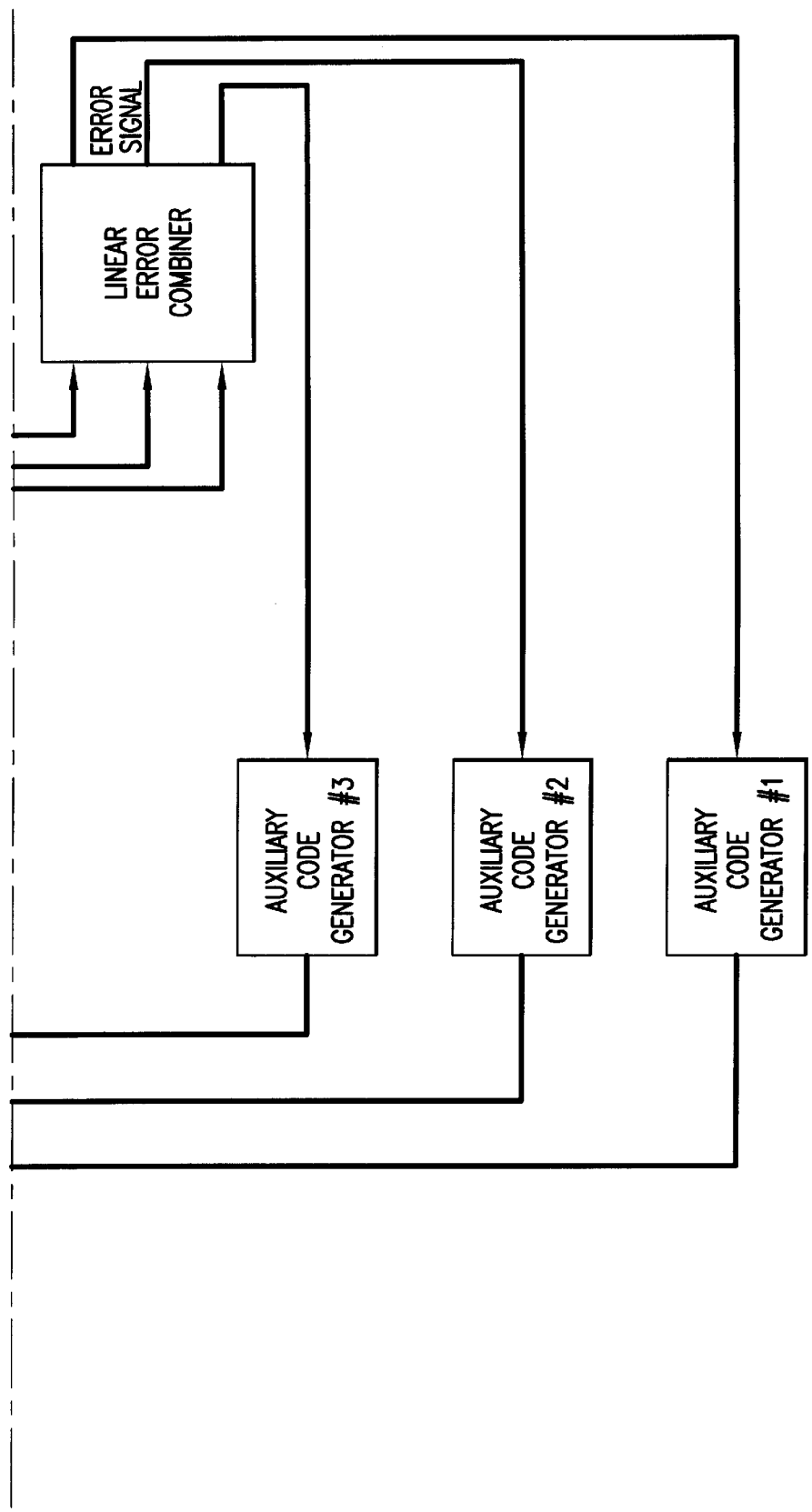
FIG. 10 is a functional block diagram of a further variation of the adaptive receiver according to the invention.

The linear combiner (LC) architecture represents a hybrid solution between the Baseline and the OA/SA. The main feature is that while there are three separate auxiliary sequences for each EC-BAID detector. Differently from the baseline EC-BAID, the error signals are linearly combined so that the three detectors are not anymore disjoint. By doing so the convergence speed is improved compared to the baseline although the complexity advantage shown by the S&A is not achieved. Details about the combination law are provided in next Section herein. The LC EC-BAID top level architecture is shown in FIG. 10.

EC-BAID Architectures Summary

Baseline Architecture

As shown in the previous paragraphs, the EC-BAID I and EC-BAID II versions formerly proposed require three separate units, each with its own local copy of $x_1$; the first unit processes symbol periods (r−1)-th, r-th and (r+1)-th to produce the output $b_1(\tau)$, the second one processes symbol periods (r)-th, (r+1)-th and (r+2)-th to produce the output $b_1(r+1)$, and the third unit operates likewise to produce $b_1(r+2)$. This way, the generic n unit includes its own $x^{e,n}_1$ local vector, to be updated every 3T with the contribution (error signal) of its own output. The equations for this baseline architecture are summarized in Table 1.

TABLE 1

Equation EC-BAID-I and EC-BAID-II for the
baseline architecture

EC-BAID-I and EC-BAID-II, Baseline output construction:

$$b_1(3s+n-1) = \frac{1}{L} h_1(s)^T \cdot y^c(3s+n-1) \quad \text{with } h_1(s) = x_1(s) + c_1$$

with n EC-BAID detector index

EC-BAID-I, updating of vectors $x_1$
$x_{1,w}(s+1) = x_{1,w}(s) - \gamma e_{1,w}(s) \quad w = -1, 0, 1$ $$e_{1,w}(s)^{\Delta} b_1(3s+n-1) \left[ y_w(3s+n-1) - \frac{Y_w(3s+n-1)^T \cdot c_1}{L} C_1 \right] \quad w = -1, 0, 1$$

with s super-symbol index

EC-BAID-II, updating of vectors $x_1$
$x_1(s+1) = x_1(s) - \gamma e_1(s)$ $$e_1(s)^{\Delta} b_1(3s+n-1) \left[ y^{en}(3s+n-1) - \frac{y^{en}(3s+n-1)^T \cdot c_1}{L} C_1 \right]$$

with s super-symbol index with

|  | 0 | $x_{1,-1}(s)$ | $e_{1,-1}(s)$ |
|---|---|---|---|
| $c_1 \triangleq c_1$, | $x_1(s)^{\Delta}$ | $x_{1,0}(s)$, | $e_1(s)^{\Delta}$ | $e_{1,0}(s)$ |
|  | 0 | $x_{1,+1}(s)$ | $e_{1,1}(s)$ |

"Overlap and Add" Architecture

The EC-BAID-I and EC-BAID-II versions named "Overlap and Add" (O&A), bring about an improvement: the three units still process input data symbols producing in turn the desired output $b_1$, this time using a unique vector $x_1$. This vector is now updated with the sum of the three unit contributions (sum of the three error signals), still every $3T_s$.

The advantage obtained from this architecture is twofold: from the area saving point of view now only one vector $x_1$ rather than 3 need to be stored, while from the speed performance point of view the x1 updating is three times faster, since every 3T, three contributions are summed together instead of one only. The equations for the O&A architecture are summarized in Table 2.

TABLE 2

Equations EC-BAID-I and EC-BAID-II for the
"Overlap and Add" architecture

EC-BAID-I and EC-BAID-II, Overlap and Add-output construction:

$$b_1(3s+n-1) = \frac{1}{L} h_1(s)^T \cdot y^c(3s+n-1) \quad \text{with } h_1(s) = x_1(s) + c_1$$

with n EC-BAID detector index

EC-BAID-I Overlap and Add, updating of vectors $x_1$
$x_{1,w}(s+1) = x_{1,w}(s) - \gamma [e_{1,w}(s-1) + e_{1,w}(s-1)] \quad w = -1, 0, 1$ $$e_{1,w}(s)^{\Delta} b_1(3s+n-1) \left[ y_w(3s+n-1) - \frac{y_w(3s+n-1)^T \cdot c_1}{L} C_1 \right] \quad w = -1, 0, 1$$

with s super-symbol index

EC-BAID-II Overlap and Add, updating of vectors $x_1$
$x_1(s+1) = x_1(s) - \gamma [e_1(s-1) + e_1(s-1) + e_1(s-1)]$ $$e_1(s)^{\Delta} b_1(3s+n-1) \left[ y^{en}(3s+n-1) - \frac{y^{en}(3s+n-1)^T \cdot c_1}{L} C_1 \right]$$

with s super-symbol index with

|  | 0 | $x_{1,-1}(s)$ | $e_{1,-1}(s)$ |
|---|---|---|---|
| $c_1 \triangleq c_1$, | $x_1(s)^{\Delta}$ | $x_{1,0}(s)$, | $e_1(s)^{\Delta}$ | $e_{1,0}(s)$ |
|  | 0 | $x_{1,+1}(s)$ | $e_{1,1}(s)$ |

"Select and Add" Architecture

The final architecture proposed to implement EC-BAID-I and EC-BAID-II, named "Select and Add" (S&A) provides the same bit error rate and convergence speed performances of the O&A one but it allows a considerable circuit complexity reduction.

Its top level block diagram shown in FIG. 2, where the detector unit is now the one sketched in FIG. 8.

The S&A architecture exploits the possibility of using a clock of period $T_c/3$ so that it is possible to use the arithmetical part of the circuit three times for each $T_c$; this allows to calculate the output $b_1(\tau)$ in one period $T_s$, getting the entire product $x^e_1(r)^T \cdot c^e_1$ and to update, in the same period $T_s$, the whole vector $x^e_1$ with the 3L error signal coefficients. The equations for the S&A architecture are shown in Table 3.

The Linear Combiner Architecture

The linear combiner (LC) architecture represents a hybrid solution between the Baseline and the OA/SA. The main feature is that while there are three separate auxiliary sequences for each EC-BAID detector they interact through a linear combination of the respective error signals as it has been discussed before.

The functioning of the LC EC-BAID is regulated by the set of equations shown in Table 4:

TABLE 3

Equations EC-BAID-I and EC-BAID-II for the
"Select and Add" architecture

EC-BAID-I and EC-BAID-II, Select and Add-output construction:

$$b_1(r) = \frac{1}{L} h_1(r)^T \cdot y^c(r) \quad \text{with } h_1(r) = x_1(r) + c_1$$

EC-BAID-I Select and Add, updating of vectors $x_1$
$x_{1,w}(r+1) = x_{1,w}(r) - \gamma\, e_{1,w}(r-1) \quad w = -1, 0, 1$ $$e_{1,w}(r)^{\Delta} b_1(r) \left[ y_w(r) - \frac{y_w(r)^T \cdot c_1}{L} C_1 \right] \quad w = -1, 0, 1$$

with r symbol index

TABLE 3-continued

Equations EC-BAID-I and EC-BAID-II for the
"Select and Add" architecture

EC-BAID-II Select and Add, updating of vectors $x_1$
$x_1(r + 1) = x_1(s) - \gamma\, e_1\, (r - 1)$ $$e_1(r)^{\Delta} b_1(r)\left[y^{en}(r) - \frac{y^{en}(\tau)^T \cdot c_1}{L} C_1\right]$$

with r symbol index with $$c_1 \stackrel{\Delta}{=} c_1, \quad x_1\,(r)^{\Delta} \begin{array}{c} 0 \\ x_{1,0}(r) \\ 0 \end{array} \begin{array}{c} x_{1,-1}(r) \\ x_{1,0}(r), \\ x_{1,+1}(r) \end{array} \quad e_1\,(r)^{\Delta} \begin{array}{c} e_{1,-1}(r) \\ e_{1,0}(r) \\ e_{1,1}(r) \end{array}$$

TABLE 4

Equations EC-BAID-I and EC-BAID-II for the
"Linear Combiner" architecture (n = 1, 2, 3)

EC-BAID-I and EC-BAID-II, Overlap and Add-output construction:

$$b_1(3s + n - 1) = \frac{1}{L} h_1(s)^T \cdot y^c(3s + n - 1) \quad \text{with } h_1(s) = x_1(s) + c_1$$

with n EC-BAID detector index

EC-BAID-I Linear Combiner, updating of vectors $x_1$
$x_{1,w}(s + 1) = x_{1,w}(s) - \gamma[e_{1,w}(s) + e_{1,w}(s) + e_{1,w}(s)]$
$x_{1,w}(s + 1) = x_{1,w}(s) - \gamma[e_{1,w}(s + 1) + e_{1,w}(s) + e_{1,w}(s)]\ w = -1, 0, 1$
$x_{1,w}(s + 1) = x_{1,w}(s) - \gamma[e_{1,w}(s + 1) + e_{1,w}(s + 1) + e_{1,w}(s)]$ $$e_{1,w}(s)^{\Delta} b_1(3s + n - 1)\left[y_w(3s + n - 1) - \frac{y_w(3s + n - 1)^T \cdot c_1}{L} C_1\right]\ w = -1, 0, 1$$

with s super-symbol index

EC-BAID-II Linear Combiner, updating of vectors $x_1$
$x_1\,(s + 1) = x_1\,(s) - \gamma[e_1\,(s) + e_1\,(s) + e_1\,(s)]$
$x_1\,(s + 1) = x_1\,(s) - \gamma[e_1\,(s + 1) + e_1\,(s) + e_1\,(s)]$
$x_1\,(s + 1) = x_1\,(s) - \gamma[e_1\,(s + 1) + e_1\,(s + 1) + e_1\,(s)]$ $$e_1\,(s)^{\Delta} b_1(3s + n - 1)\left[y^{en}(3s + n - 1) - \frac{y^{en}(3s + n - 1)^T \cdot c_1}{L} C_1\right]$$

with s super-symbol index with $$c_1 \stackrel{\Delta}{=} c_1, \quad x_1\,(s)^{\Delta} \begin{array}{c} 0 \\ x_{1,0}(s) \\ 0 \end{array} \begin{array}{c} x_{1,-1}(s) \\ x_{1,0}(s), \\ x_{1,+1}(s) \end{array} \quad e_1\,(s)^{\Delta} \begin{array}{c} e_{1,-1}(s) \\ e_{1,0}(s) \\ e_{1,1}(s) \end{array}$$

Figure 11:
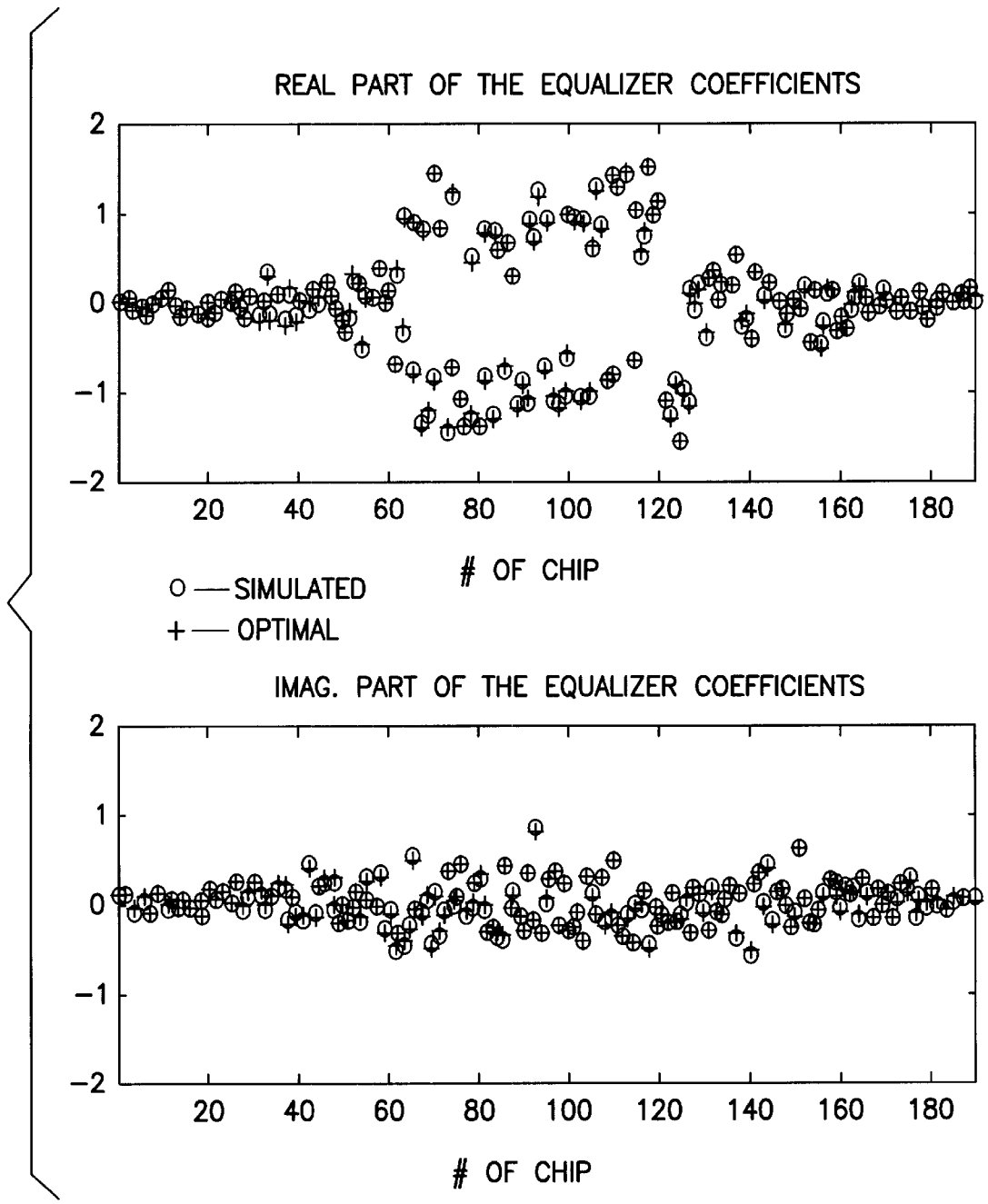
FIG. 11 illustrates the adaptation convergence of the adaptive receiver of the invention.

Numerical results, both analytical and computer simulated, show excellent and fast convergence of the adaptation algorithm and further show an independence of the mean square error to the phase offset of interfering signals. This convergence of the adaptation algorithm is illustrated by the diagram of FIG. 11 that shows the convergence of the real and imaginary parts of the adaptation coefficients in the conditions specified.

Figure 12:
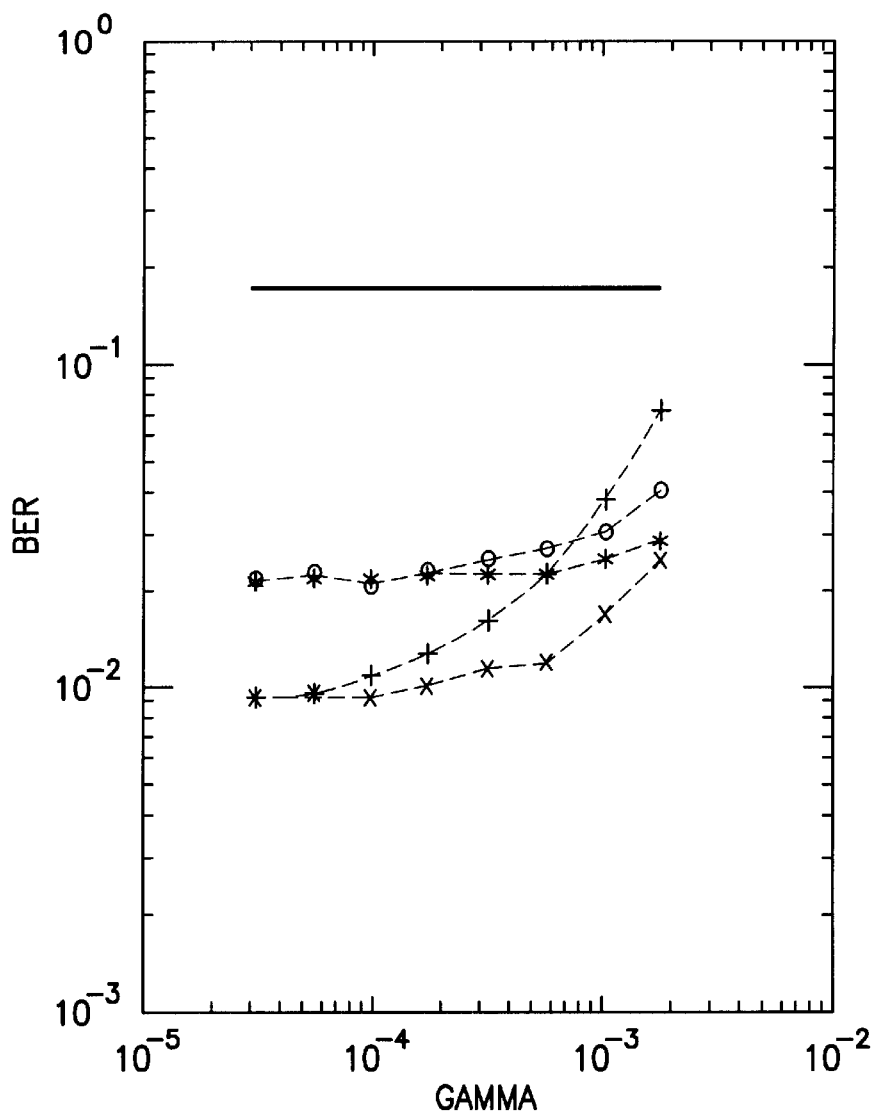
FIG. 12 shows the variation of BER vs the adaptation factor Gamma for various detector types.

It should also be mentioned that the blind adaptive receiver of the invention shows an excellent robustness to the residual frequency errors of the useful signal at the input of the detector unit. This result is obtained thanks to the use of complex coefficients for the auxiliary code as outlined earlier herein. This behaviour of the receiver of the invention is illustrated by the diagram of FIG. 12 showing the variation of the binary error rate BER versus the adaptation factor $\gamma$ for various detector types.

One of the strong points in favor of the (E)C-BAID characterized by complex-valued coefficients, is related to its performance independence to interferers frequency offset. Such same frequency offset can be quite large compared to the symbol rate in a Low- or Medium Earth Orbiting (LEO-MEO) satellite constellation. This important (E)C-BAID feature is testified by FIG. 13.

Figure 13:
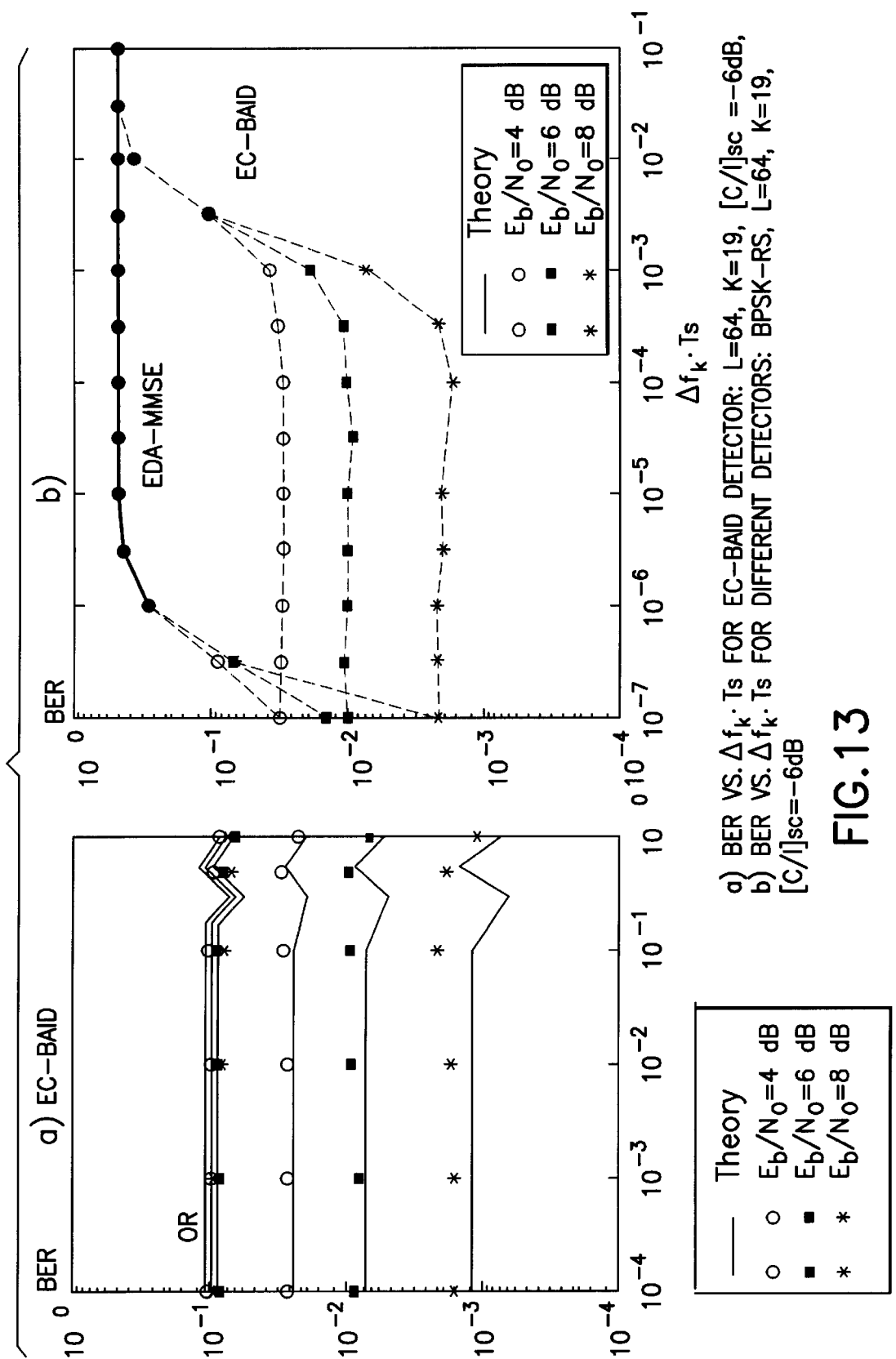
FIG. 13 shows the variation of BER vs $\Delta \cdot f_k \cdot T_s$ for various detector types.

The diagram of FIG. 13 shows that the receiver according to this invention is more robust to frequency error than a known DA-MMSE detector. More particularly, the robustness to frequency error of the receiver of the invention is three orders of magnitude larger than that of the DA-MMSE schema. It is thus compatible to the typical standard deviation of the frequency estimator 25. In addition, cancellation of MAI expressed in terms of BER is comparable to the performance of the data-aided adaptive processing.

Figures 14, 14A:
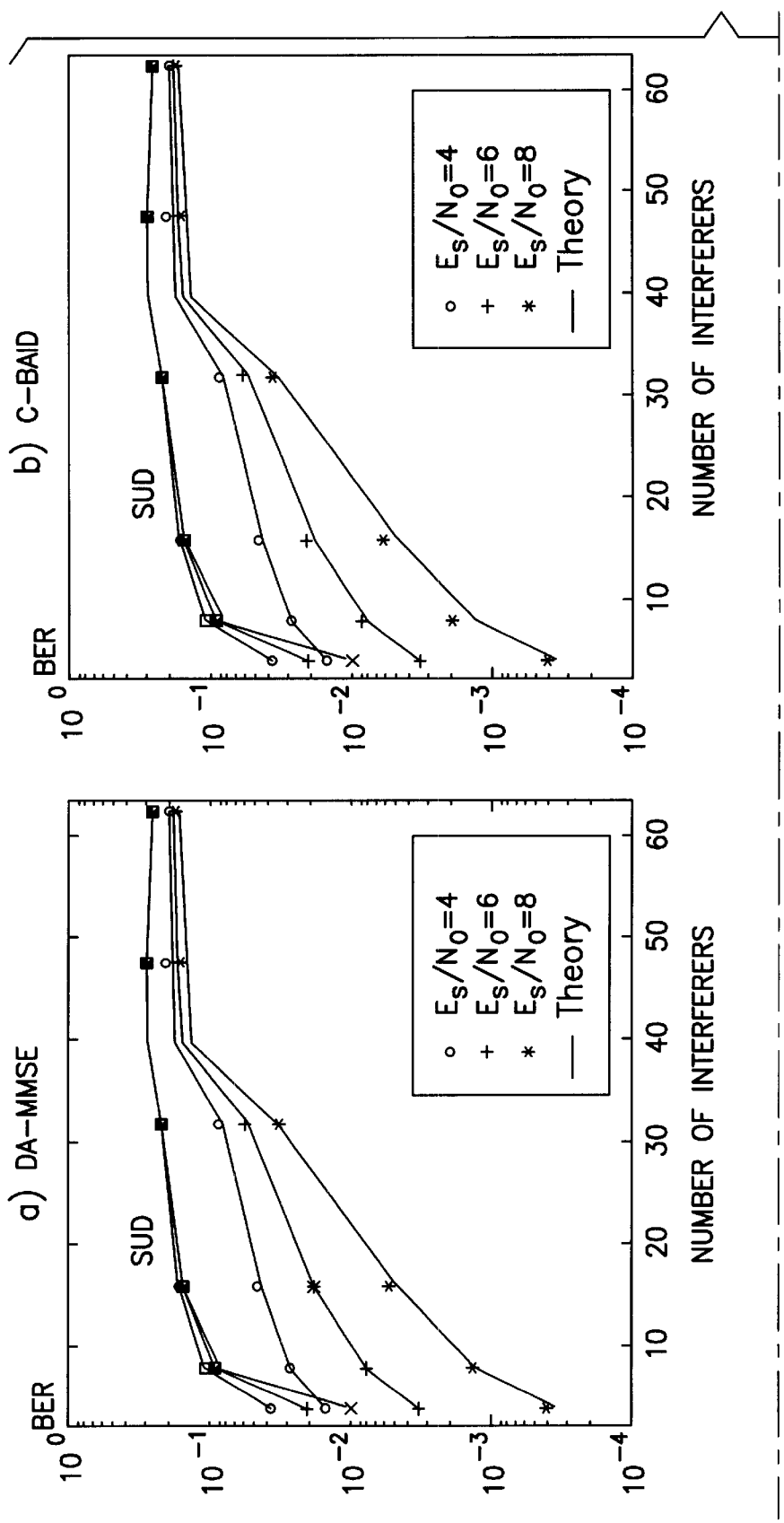
FIG. 14 shows the variation of VER vs the number of interferers for various detector types.
Figure 14B:
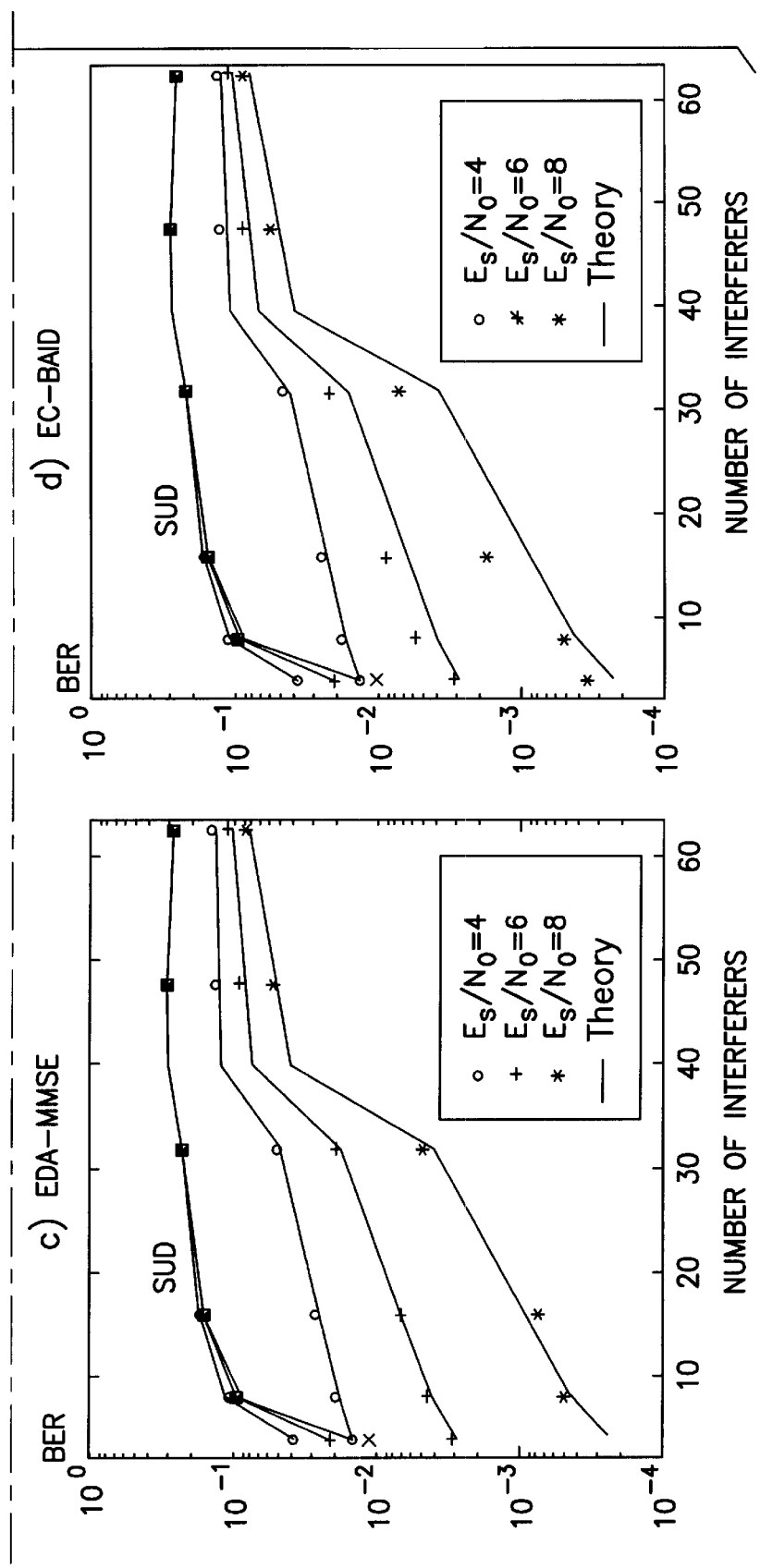

With regard to the number of interfering users, the binary error rate (BER) of the detector of the invention reveals that the extended version of the detector makes it possible to increase substantially the number of interfering users even in cases where the useful signal power is substantially lower than the interfering signal power. This is exemplified in the case of a satellite communication system in which the power control is slow because of the propagation time. This performance is comparable to that of the conventional data-aided adaptive detector (EDA-MSE) as shown by FIG. 14 which represents the BER versus the number of interfering signals for various adaptivbe detector types with different values of the ratio $E_b/N_o$ between the average received energy of the quaternary constellation symbols at the edge of the beam and the one-sided AWGN (additional white gaussian noise) power spectral density $N_o$.

The impact of the different types of detectors is well evidentiated looking at the statistical distribution of the total signal-to-noise plus interference ratio at the detector output $\rho$.

Figure 15:
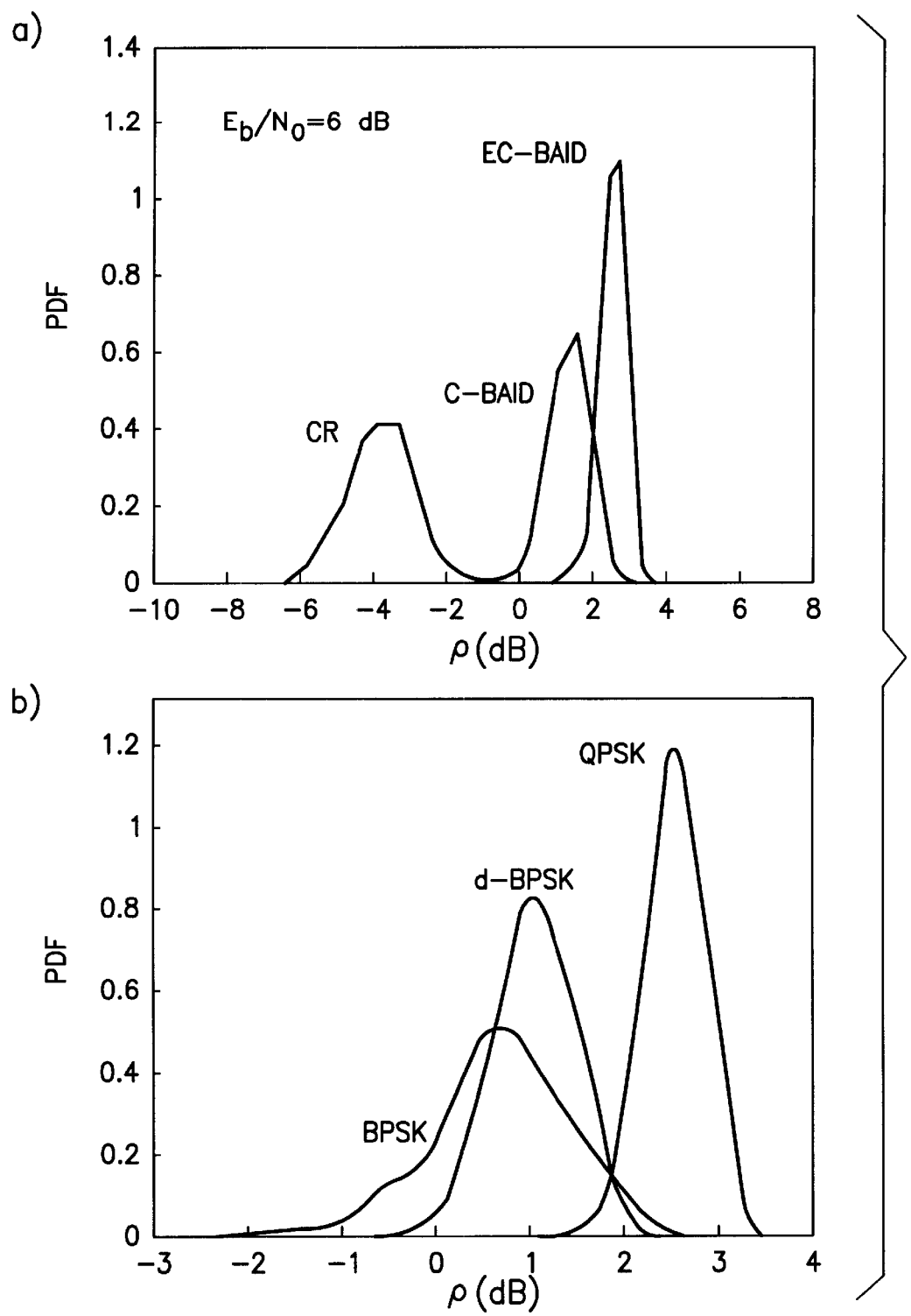
FIG. 15 shows the PDF vs factor $\rho$ for various detector types.

FIG. 15 shows the probability density function (PDF) of $\rho$ for the CR, the C-BAID and the EC-BAID, with random interferers' carrier phases and code delays. It is fairly evident that the values of $\rho$ at the output of the CR show a relatively large dispersion, due to the different delay and carrier phase assignments on the active channels. The effect of the interference-mitigating detectors is twofold: first, they obviously increase the mean value of $\rho$ so as to improve the mean quality of the link; second, they reduce the dispersion of $\rho$ around its mean value, and this has the effect of reducing the outage probability of the link. CDMA with long codes (sometimes referred to as Random CDMA) is not easily amenable to interference mitigation, but the use of long codes causes a sort of symbol-by-symbol randomization of MAI to pursue the same goal of outage probability reduction. This attractive feature of the EC-BAID is further enhanced by the use of d-BPSK or QPSK-RS signal formats.

Figure 16:
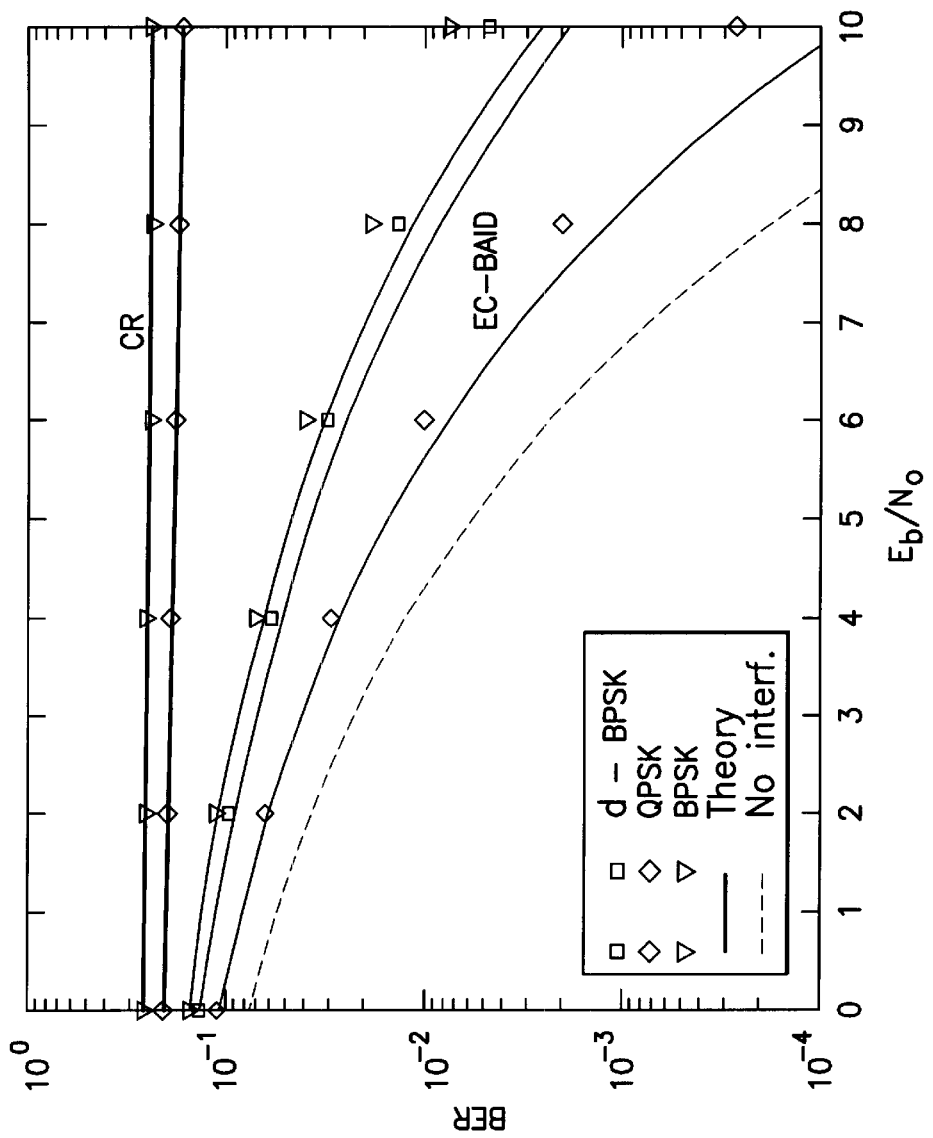
FIG. 16 shows the variation of BER vs the ratio $E_o/N_o$ for various detector types.

FIG. 11b shows simulation results for the pdf of $\rho$ in the case of BPSK, d-BPSK and QPSK. The occupied bandwidth being equal, d-BPSK/QPSK-RS allow the use of signature sequences having a repetition period which is twice that of the codes of the BPSK-RS or BPSK-CS cases, thus doubling the codebook size (i.e., the maximum number of sequences available) and yielding a twofold capacity. Also, looking at FIG. 11b it can be observed that, though BPSK and d-BPSK have similar average value of $\rho$, the variance is reduced for the latter. Compared to d-BPSK, QPSK-RS provides a further advantage in terms of average $\rho$ increase and $\sigma_r$ reduction due to the fact that each signal employs one and not two spreading sequences as for d-BPSK. Although immaterial to the CR, this feature reduces the number of space dimensions occupied by the CDMA multiplex, thus enhancing EC-BAID interference mitigation capabilities. The QPSK-RS advantage versus BPSK-RS and d-BPSK in terms of BER for a typical (fixed) interferer delay distribution is shown in FIG. 16. Monte Carlo BER simulations results utilizing the adaptive LMS version of the EC-BAID described earlier closely follows theoretical predictions.

Fading Performance

Figures 17, 17A, 17B:
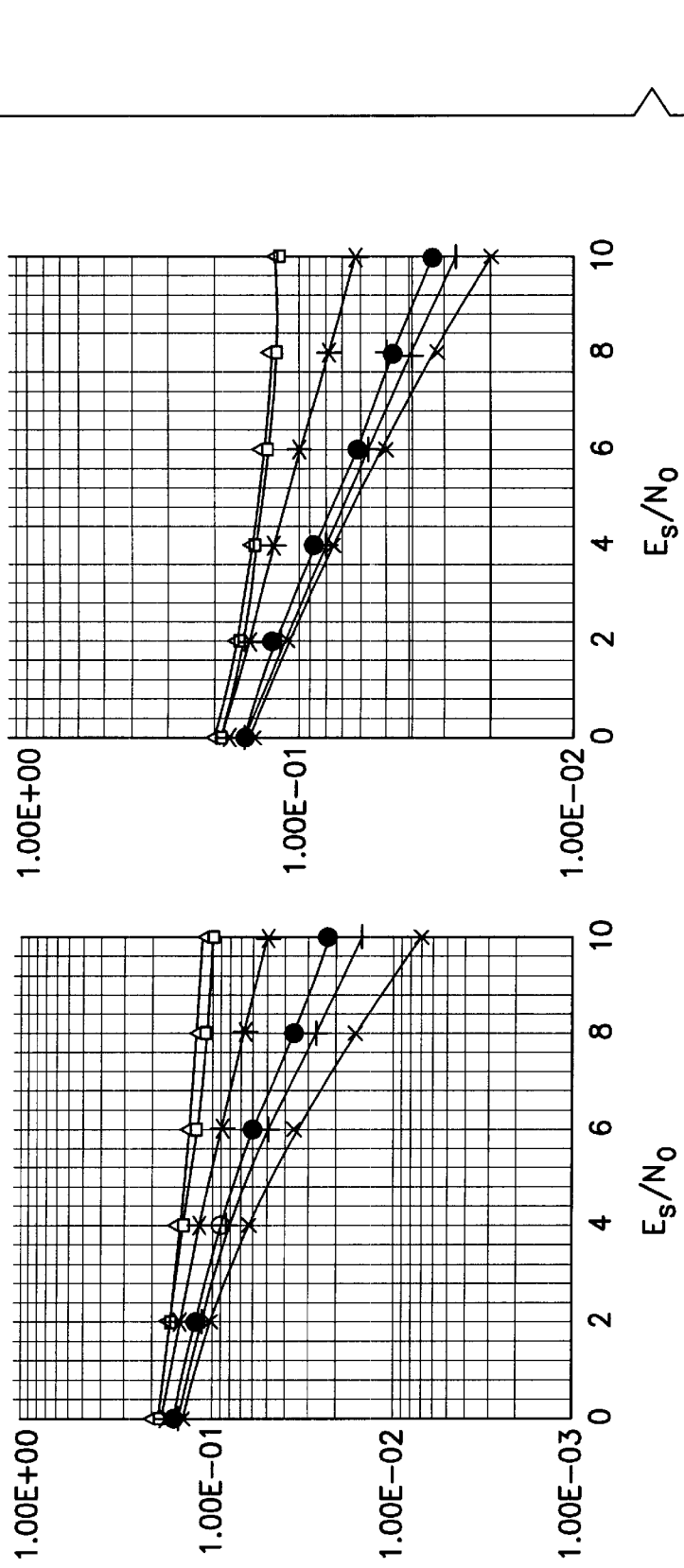
FIG. 17 illustrates the simulation results showing BER vs the ratio $E_o/N_o$ for various detector types.
Figure 17B:
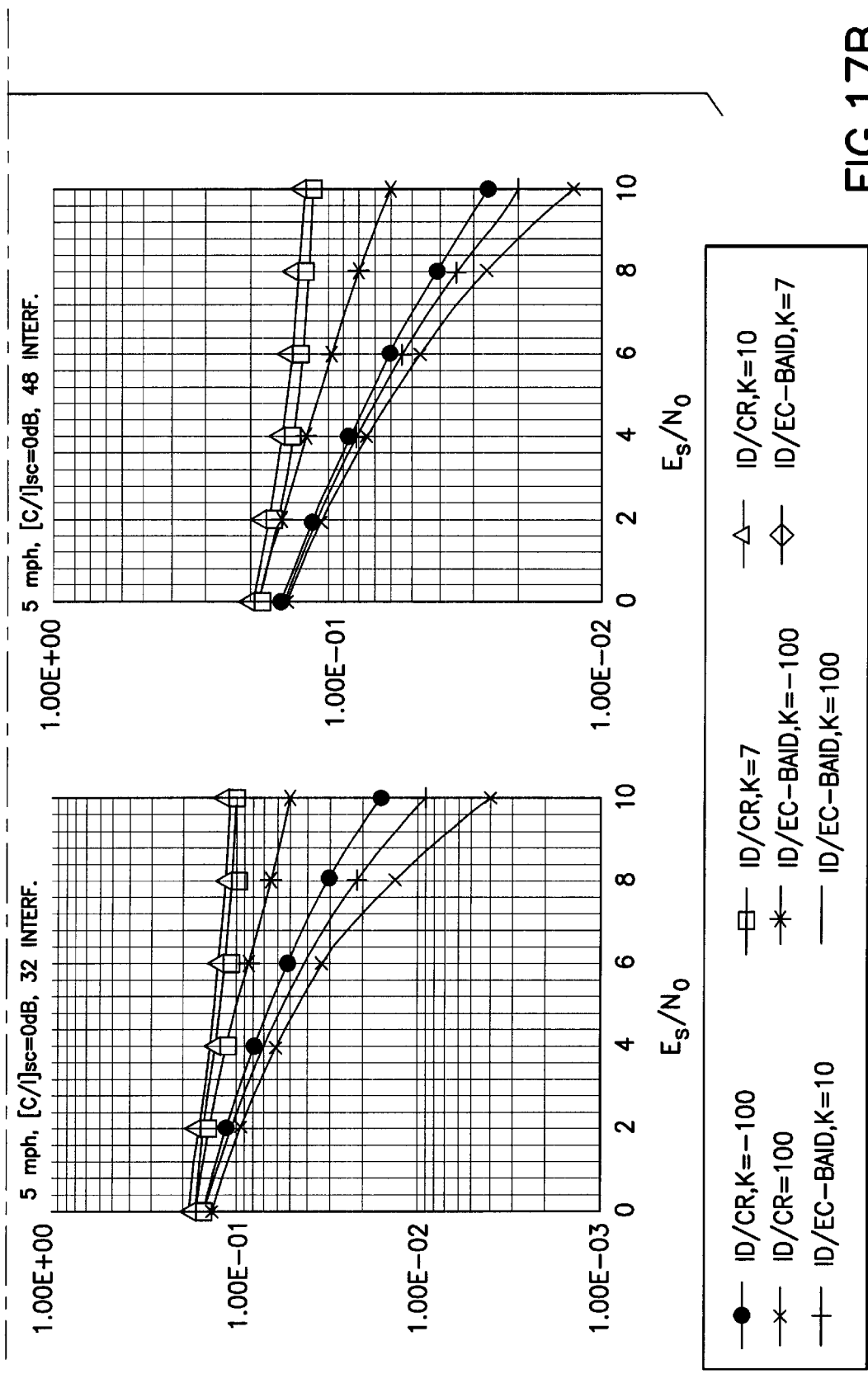

Thanks to the previously described (E)C-BAID rotationally phase invariance the proposed detector is capable to provide remarkable performance also over flat fading channels where both useful signal and interferers ar affected by independent Rician fading with Rice factor K and the user speed ranges from 5 to 80 mph (assuming a 2 GHz carrier frequency). As the simulation results in FIG. 17 indicate, the EC-BAID provides a remarkable advantage over conventional CDMA correlation receivers even other fast fading channels. In all simulations the useful signal carrier phase has been (ideally) estimated after the EC-BAID. Although results in FIG. 17 assume ideal channel estimation, similar performance have been achieved using pilot-aided channel estimation techniques.

It was observed that simulation results remain practically unchanged by removing the fading on the CDMA interferers even in the case of fast fading. This fact demonstrates that the EC-BAID is intrinsically robust with respect to MAI flat fading fluctuations (both in amplitude and phase).

Satellite Path Diversity

The proposed (E)C-BAID detector is also well suited for mobile satellite systems whereby satellite path diversity is adopted. In this case typically a different spreading sequence is used for each forward link satellite signal although the information bits transmitted are the same. In this case the FIG. 18 block diagram is modified as shown in the following FIG. 15 whereby a same EC-BAID possible implementation is exemplified. Assuming that up to $N_D$ diversity order is implemented in the system, then the demodulator is composed by $N_D$ EC-BAID each of them dealing with the signal coming from a different satellite. Because of the different satellite geometry independent fine frequency and time/phase adjustment is required on each finger. In case the differential delay exceeds the symbol duration (as it is often the case), the delay ambiguity shall be resolved by means of external and as frame unique word not shown here for simplicity.

In any case, the symbols of the same data stream transmitted by different satellites shall be spread by a satellite and user unique sequence and staggered in time so that there is no possibility that the same symbol (±1 symbol in case of EC-BAID) overlaps with another diversity path coming from a different satellite.

This staggering technique is illustrated as follows:

|  | $T_s$ = LTo | | | |
|---|---|---|---|---|
| Satellite #1 | $d_1$ | $d_2$ | $d_3$ | Transmitted $d_4$ symbols |
| Satellite #2 |  |  |  | $d_1$  $d_2$ |
|  | (E)C-BAID window (BLTc) | Maximum Differential Delay | Guard time |  |
|  | Actual diversity signals time offset | | | |

Figure 18:
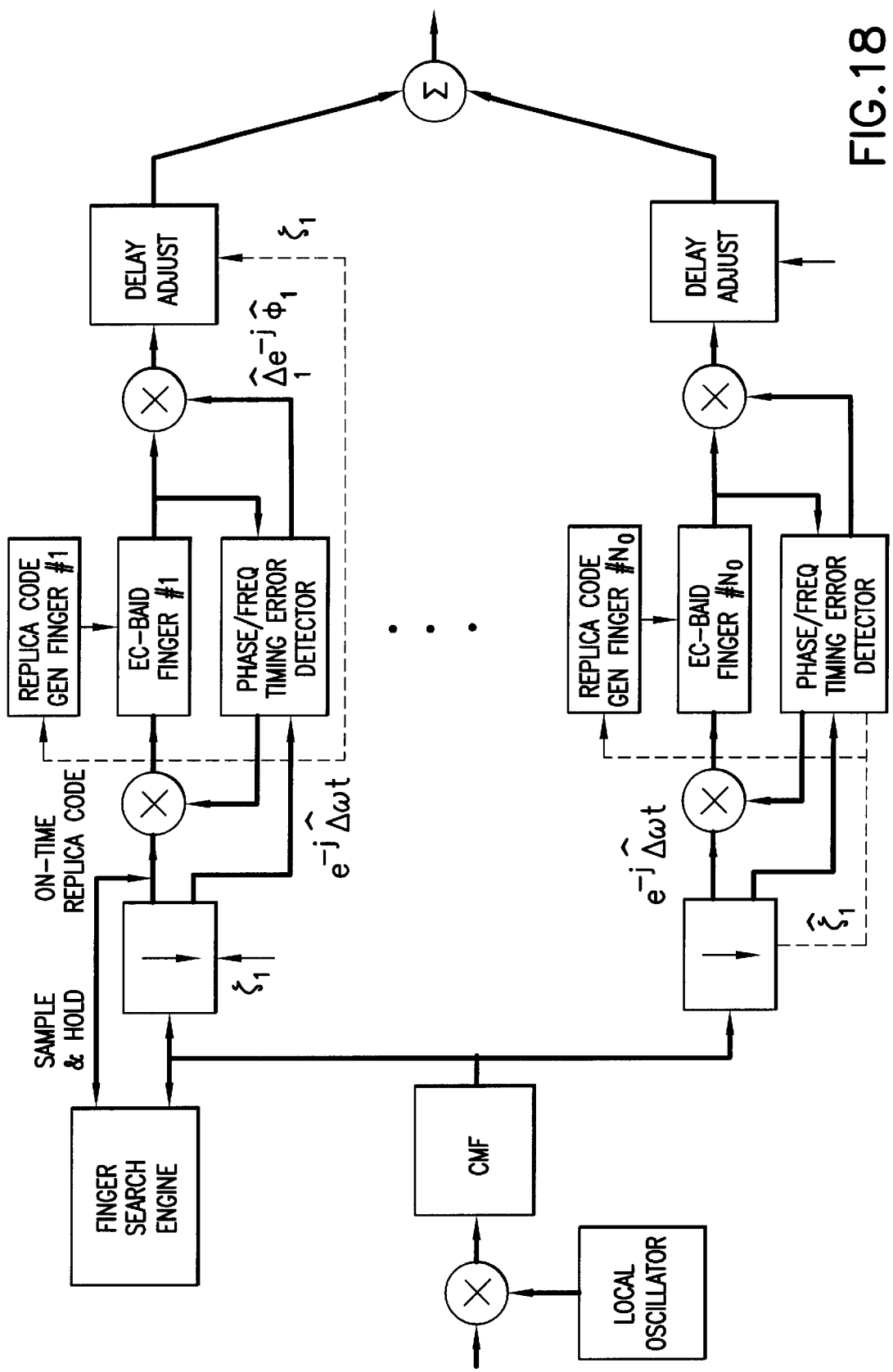
FIG. 18 is a functional block diagram of another variation of the adaptive receiver of the invention.

This modulator symbol staggering is then recovered at the demodulator side by means of the delay adjustment block shown in FIG. 18. This is a very important technique to avoid possible destructive interaction between useful and diversity path within each EC-BAID demodulator.

EC-BAID Application to Multi-rate CDMA

All of the third-generation standards for wireless CDMA, be it terrestrial or satellite, encompass a multi-rate access capability to accommodate best multimedia services. All rates are integer sub-multiples of a maximum rate $R_M$ (e.g., 2048 or 384 kb/s) which depends on the kind of terminal (fixed, indoor, fully mobile etc.) and network (indoor, outdoor terrestrial, satellite etc.). Usually, but not necessarily, the supported bit rates are in the form $R_{ck}=R_M/2^k$ just for easier implementation and coordination, while of course the chip rate $R_c$ is invariably the same on every allocated channel.

A recently proposed approach to deal with multi-rate CDMA makes use of the so-called OVSF codes. The OVSF codes family is just a re-labeled version of the popular set of Walsh-Hadamard codes class, wherein the re-labeling is the value-added feature. Specifically, the OVSF are a re-organization of the Walsh code in layers. The codes on each layer have twice the length of the codes in the layer above.

Also, the codes are organized in a tree, wherein any two "children" codes on the layer underneath a "parent" code are generated by repetition and repetition with sign change, respectively. The peculiarity of the tree is that a pair of codes is not only orthogonal within each layer (each layer is just the complete set of the Walsh codes of the corresponding length), but they are also orthogonal between layers, provided that the shorter one is not an ancestor of the longer.

Figure 19:
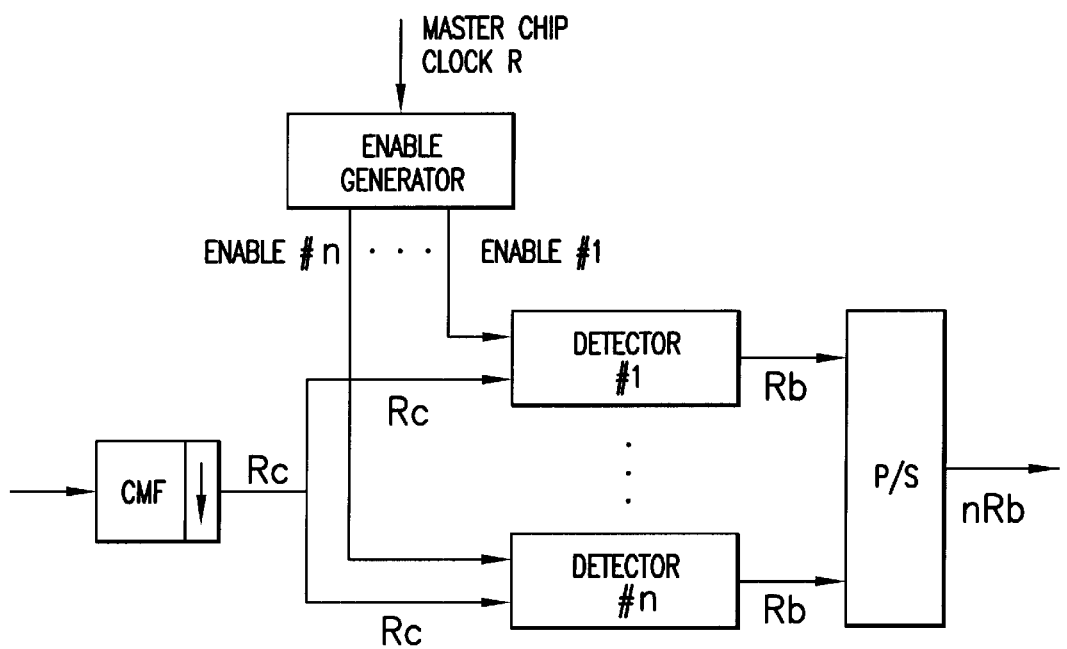
FIG. 19 is a block diagram of a multi-rate detector of the invention for the highest rate in a network.
Figure 19:
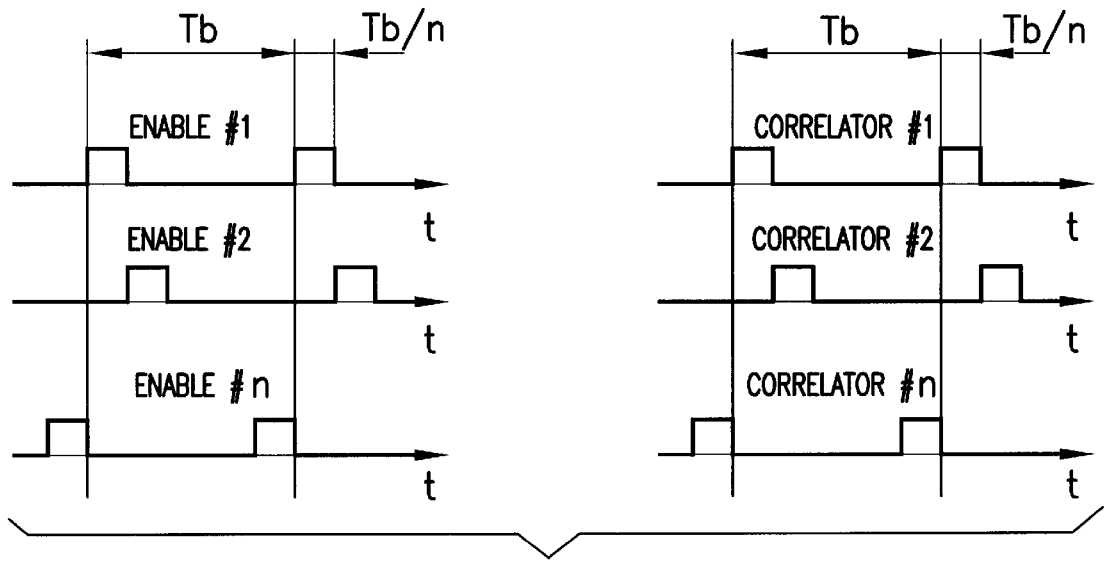

FIG. 19 illustrates an example of two user signals with different bit rates, namely, rate $R_o$ for the upper signal and rate $4R_o$ for the lower one. The former uses the length-8 code $C_3(3)$, while the latter employs the length-2 code $C_1(1)$. The two codes are orthogonal since the longer one does not have $C_1(1)$ as ancestor at layer 1. Therefore, a conventional correlation receiver suffers from no MAI either when used on signal 1 or on signal 2.

Let us first examine the demodulator for the "slow" signal #1. It can be said that the interference generated by signal #2, when observed on a "long" symbol time $T_c=1/R_c$ bears a time-varying spreading code. Assuming $a_2(1)$ as the "reference" symbol, signal #2 can be fictitiously seen as a rate $R_o$ DS-SS signal transmitting just $a_2(1)$, and with a spreading code equal to $$[C_1(1)a_2(1)a_2(2)C_1(1)a_2(1)a_2(3)\ C_1(1)a_2(1)a_1(1)a_2(4)C_1(1)]$$

Of course, if the signals are synchronous, they stay orthogonal by virtue of the OVSF codes properties, and the time-variance described above is immaterial. An issue may arise when the multi-rate MAI is asynchronous to the desired user (i.e., inter-cell or inter-beam interference in the forward link). Assume now we have to demodulate the generic user signal #m in a CDMA network with asynchronous interference (either intra-cell/beam MAI in the uplink or inter-cell/beam MAI in the downlink), and assume also that it has the highest rate allowed in the network. The relation of all interfering signal to signal #m will be similar to that of signal #1 to signal #2, all of them will bear a longer code than user #m. The latter will therefore see a set of cyclically varying spreading codes on the interfering signal, whose repetition period will be in general the ratio M between the highest and the lowest bit rate allowed in the network. The interference-mitigating detector for user #m can therefore be designed exploiting this cyclical regularity. It will be made of a bank of M conventional EC-BAIDs which are cyclically operated every M symbol periods, in such a way that everyone always sees the same (sub-)code on the interfering signals. The outputs of such detectors are then "demultiplexed" so as to give a symbol-rate stream for subsequent processing.

The situation is different if user #m has the lowest rate in the network (basic rate). In such condition, it sees a random-varying set of codes, according to the remarks in sect. 2. The solution to this case can be found as follows. What we should have to do now is to split the symbol interval into M sub-intervals and to use again M different EC-BAIDs each matched to the relevant sub-code, and each yielding a different soft-valued output. With this partitioning, each detector would see now the same code from symbol interval to symbol interval, and would follow a conventional design. The M soft outputs of such detectors would then be combined to yield the final decision variable. This sort of multi-layer linear detector is fully equivalent to a linear detector for the whole length of the symbol. Therefore, the conclusion is that a conventional EC-BAID with no modifications can be used in the case of a lower-rate signal.

Of course, if user #m has an intermediate bit-rate, the only parameter that matters is the ratio between its actual rate and the maximum rate in the net to build-up a multi-rate architecture as in FIG. 3. This figure represents the functional block diagram for a user operating at a bit rate M times the basic system bit rate $1/T_h$. As it is apparent from the previous discussion, the basic EC-BAID detectors can be reused although each of the M parallel detectors operates on a disjoint short symbol. The M detectors are sequentially activated with periodicity $T_h^{slow}$ and a duty cycle $T_h^{slow}/M$. This can be easily achieved distributing the clocks with a selector similar to the one distributing the input samples to the different EC-BAID detectors. The output soft samples at rate $1/T_h^{fast} M/T_h^{slow}$ are sequentially obtained from detectors 1 to M. The selection procedure is then repeated at the end of each period $T_h^{slow}$. It is also evident that the number of EC-BAID detectors required to a specific demodulator operating in a CDMA environment employing OVSF multi-rate techniques is proportional to the ratio between the maximum rate supported with respect to the basic network rate. The additional demodulator complexity is therefore only impacting users transmitting at higher rates then the basic one.

EC-BAID Applicability to Quasi-Random CDMA

One of the major disadvantages of symbol length sequences is that in case of a stationary system geometry the cross-correlation between two signals will repeat on a symbol-by-symbol basis thus penalizing users experiencing worst-case cross-correlation. A technique commonly adopted to overcome this problem in many practical systems consists of overlaying the user specific channelization sequence with a PN scrambling sequence having duration equal to an integer multiple (m) of the symbol duration. By doing so the cross-correlation is changing on a symbol-by-symbol basis and repeats after m symbols. This is the approach that has been adopted for the CDMA cellular Telecommunication Industry Association (TIA) standard IS-95 and the third generation (IMT-2000) Wideband CDMA proposed by several countries to the International Telecommunication Union (ITU).

It is easy to see that this quasi-random CDMA (a true random CDMA system will have a PN sequence never repeating) can be reconducted to the multi-rate case whereby a bank of (E)C-BAID detectors working in parallel but with duty cycle staggered in time, will make possible to cope with the symbol-by-symbol varying spreading sequence. It is easy to show that the random CDMA performances can be closely achieved with a relative little value for m (e.g. 4, 8) thus with an affordable demodulator complexity.

EC-BAID Applicability to Frequency Selective Channels

In case of terrestrial mobile communications (especially in urban areas), the radio channel can not be considered frequency-flat any longer, due to the large number of propagation paths generated by multiple signal reflections on buildings that cause the propagation channel to be frequency-selective. As a consequence, in this case, the BAID algorithm, that was designed for a non frequency-distorting channel, may not work properly anymore. Therefore, the BAID algorithm must be suitably modified in order to retain its effectiveness in combating the MAI also in this harsh propagation scenario. For the sake of simplicity, in the following we will refer to a two-ray only propagation channel (i.e. direct plus reflected path), but the extension of the relevant concepts to a more involved case of multipath propagation with more than two rays is rather straightforward. Under these assumptions, the complex array of the received signal samples w(r) can be expressed as follows:

$$w(r)=y(r)+\alpha y'(r)$$

where
- y(r) is the complex array of the signal samples we would receive in the absence of multipath propagation (direct path);
- y'(r) is the complex array of the delayed signal samples (reflected path);
- $\alpha$ is a complex coefficient representing the attenuation of the delayed path.

From the detector standpoint, the useful (i.e. the information-bearing) part of the received signal appears as it be spread by a modified signature code $s_1$ that can be expressed as follows:

$$s_1 = c_1 + \alpha c_1,$$

where assuming for simplicity of illustration that the multipath is delayed by an integer number of chips we can write:

$$c_1 = \left[0, 0, \overset{m}{\ldots}, 0, c_{1,1}, c_{1,2}, \overset{L=m}{\ldots}, c_{1,4-m}\right]$$

represents the delayed (truncated) replica of the spreading code, and m is the time delay, normalized with respect to the chip interval $T_r$. This fact causes a sort of 'mismatching' between the actual received signature $s_i$ and the expected nominal code $c_1$. As matter of fact, the BAID algorithm updates the adaptive part of the detector coefficients $x_1(r)$ on the basis of the 'anchoring' condition $c_i \cdot x_1(r)=0$ that leads to the cancellation of every signal belonging to the subspace orthogonal to $c_1$. Unfortunately, in the case of multipath propagation (or any other mismatch condition caused for example by incorrect input signal sampling), the a-priori anchor $c_1$ does not match anymore the input signal, and it is thus causes useful signal partial cancellation. This leads to a waste of useful signal power, that definitely causes the algorithm to become less efficient as the contribution of the delayed path gets larger (i.e. for increasing $\alpha$).

This inconvenience can be circumvented by resorting to a simple modification of the original BAID algorithm. In particular, the coefficients of the detector $h_1(r)$ shall now be expressed as:

$$h_1(r) = s_1 + x_1(r),$$

and the 'anchoring' condition shall be modified accordingly: $s_1 \cdot x_1(r)=0$. The new version of the algorithm thus becomes:

$$x_{1,1}(r) = x_{1,1}(r-1) - \gamma b_1(r-2)$$

$$y_i(r-2) - b_1(r-2)s_{1,i}]$$

where $$b_1(r) = \frac{h^T \cdot y(r)}{|s_1|^2}, \quad b_1(r) = \frac{(s_1) \cdot y(r)}{|s_1|^2}$$

and $x_{1,1}(r)$, $y_1(r)$, $s_{1,1}$ are the i-th elements of $x_1(r)$, $y(r)$ and $s_1$, respectively. The above modified algorithm allows to not only avoid the destructive multipath effects on the EC-BAID detector but also to coherently combine the multipath energy avoiding the use of the rake demodulator typically used in conventional CDMA detectors operating over frequency selective fading channels.

Essentially, in the modified algorithm, the nominal signature code $c_1$ shall be replaced by the actual received signature code (or anchor) $s_1$, which takes into account for the multipath propagation phenomena. It should be observed that this modified anchor $s_1$ is not anymore a binary code, as it was the case for the flat fading case, but a complex-valued sequence. The information concerning the channel delay profile, can be obtained from the pilot channel, which in the forward link is a DS/SS-CDMA signal broadcast with very low-rate (or without) data modulation, at a power level typically higher than the traffic channels, by every network's Base Station (BS) as a synchronization aid for the Mobile Terminals (Mts) within the cell's coverage range. Channel estimation can also be easily obtained using pilot symbol periodically inserted in the traffic channel to allow for channel estimation in the presence of smart directive antennas.

In the reverse link the use of a code division or time multiplexed pilot symbols makes possible to perform data-aided channel estimation similarly to the forward link.

Numerical results confirm the interference-mitigation capability of the modified BAID algorithm operating in the presence of multipath channel, even with strong reflected signal component (i.e. $|\alpha|=1$), provided that a reliable channel delay profile is made available.

It is to be understood that the embodiments shown in the drawings are only a few exemplary implementations given to illustrate the way of carrying out the adaptive correlation processing in accordance with the invention.

What is claimed is:

1. An adaptive receiver for CDMA signals, comprising a blind adaptive detector for detecting symbols in an incoming data stream using a user signature sequence, wherein said user signature sequence is comprised of a fixed term $C_1$ and a complex adaptive part $X_1(r)$ having a predetermined length that extends over a number of samples of the incoming data stream, said complex adaptive part being updated automatically and periodically after every interval spanning over one symbol or a plurality of symbols.

2. An adaptive receiver as claimed in claim 1, comprising means to determine said complex adaptive part from the frequency error signal measured on the signal obtained after said symbol detection.

3. An adaptive receiver as claimed in claim 2, wherein said means to determine said complex adaptive part is arranged to minimize the mean square error MSE between the output signal from said detector unit and the data within a predetermined time interval.

4. An adaptive receiver as claimed in claim 2, wherein said means to determine said complex adaptive part comprises a complex shift register and an adder.

5. An adaptive receiver as claimed in claim 1, wherein said adaptive detector comprises at least one detector unit arranged to accept the samples of the incoming data stream within an observation window extending over a predetermined number of samples.

6. An adaptive receiver as claimed in claim 1, wherein said adaptive detector comprises a plurality of detector units, each detector unit being arranged to accept the samples of the incoming data stream within a respective observation window extending over a predetermined number of samples, the observation windows for said plurality of detector units being delayed relative to each other.

7. A blind adaptive detector for dectecting symbols in an adaptive receiver for CDMA signals, comprising a blind adaptive detector for detecting symbols in an incoming data stream using a user signature sequence, wherein said user signature sequence is comprised of a fixed term $C_1$ and a complex adaptive part $x_1(r)$ having a predetermined length that extends over a number of samples of the incoming data stream, said complex adaptive part being updated automatically and periodically after every interval spanning over one symbol or a plurality of symbols.

8. A blind adaptive detector as claimed in claim 7, comprising means to determine said complex adaptive part from the frequency error signal measured on the signal obtained after said symbol detection.

9. A blind adaptive detector as claimed in claim 8, wherein said means to determine said complex adaptive part is arranged to minimize the mean square error MSE between the output signal from said detector unit and the data within a predetermined time interval.

10. A blind adaptive detector as claimed in claim 8, wherein said means to determine said complex adaptive part comprises a complex shift register and an adder.

\* \* \* \* \*